United States Patent [19]
Suda et al.

[11] Patent Number: 5,473,403
[45] Date of Patent: Dec. 5, 1995

[54] CAMERA HAVING A MULTI-POINT FOCUS DETECTING DEVICE

[75] Inventors: Yasuo Suda; Akira Yamada, both of Yokohama; Akihiko Nagano, Ichihara, all of Japan

[73] Assignee: Canon Kabushiki Kaisha, Tokyo, Japan

[21] Appl. No.: 62,219

[22] Filed: May 18, 1993

[30] Foreign Application Priority Data

May 22, 1992 [JP] Japan ................................. 4-154168

[51] Int. Cl.⁶ ................................................. G03B 13/36
[52] U.S. Cl. .................... 354/409; 354/195.13; 354/219
[58] Field of Search ....................... 354/400, 402, 354/403, 409, 195.13, 219, 222

[56] References Cited

U.S. PATENT DOCUMENTS

| | | | |
|---|---|---|---|
| 4,313,657 | 2/1982 | Tokutomi et al. | 354/289 |
| 4,478,493 | 10/1984 | Yokota | 354/222 |
| 4,716,282 | 12/1987 | Akashi et al. | 250/201 |
| 4,825,239 | 4/1989 | Suda et al. | 354/402 |
| 4,827,303 | 5/1989 | Tsuboi | 354/409 |
| 4,994,843 | 2/1991 | Kitazawa | 354/409 |
| 5,019,854 | 5/1991 | Mukai et al. | 354/402 |
| 5,091,742 | 2/1992 | Fukahori et al. | 354/402 |
| 5,128,705 | 7/1992 | Someya et al. | 354/402 |
| 5,189,462 | 2/1993 | Nakajima | 354/409 |
| 5,235,380 | 8/1993 | Yamada et al. | 354/409 |
| 5,245,371 | 9/1993 | Nagano et al. | 354/219 |
| 5,245,381 | 9/1993 | Takagi et al. | 354/219 |
| 5,264,889 | 11/1993 | Ishida et al. | 354/402 |

*Primary Examiner*—Russell E. Adams
*Attorney, Agent, or Firm*—Fitzpatrick, Cella, Harper & Scinto

[57] ABSTRACT

The present invention relates to a multi-point distance measuring camera. The present invention provides a camera in which target marks representative of distance measuring points are indicated in an image field in a finder to thereby indicate for which object focus detection can be effected and the indication of the marks representative of those of the distance measuring points which are in a state incapable of distance measurement is prohibited to thereby enable a photographer to appropriately know a position in which distance measurement is possible.

40 Claims, 14 Drawing Sheets

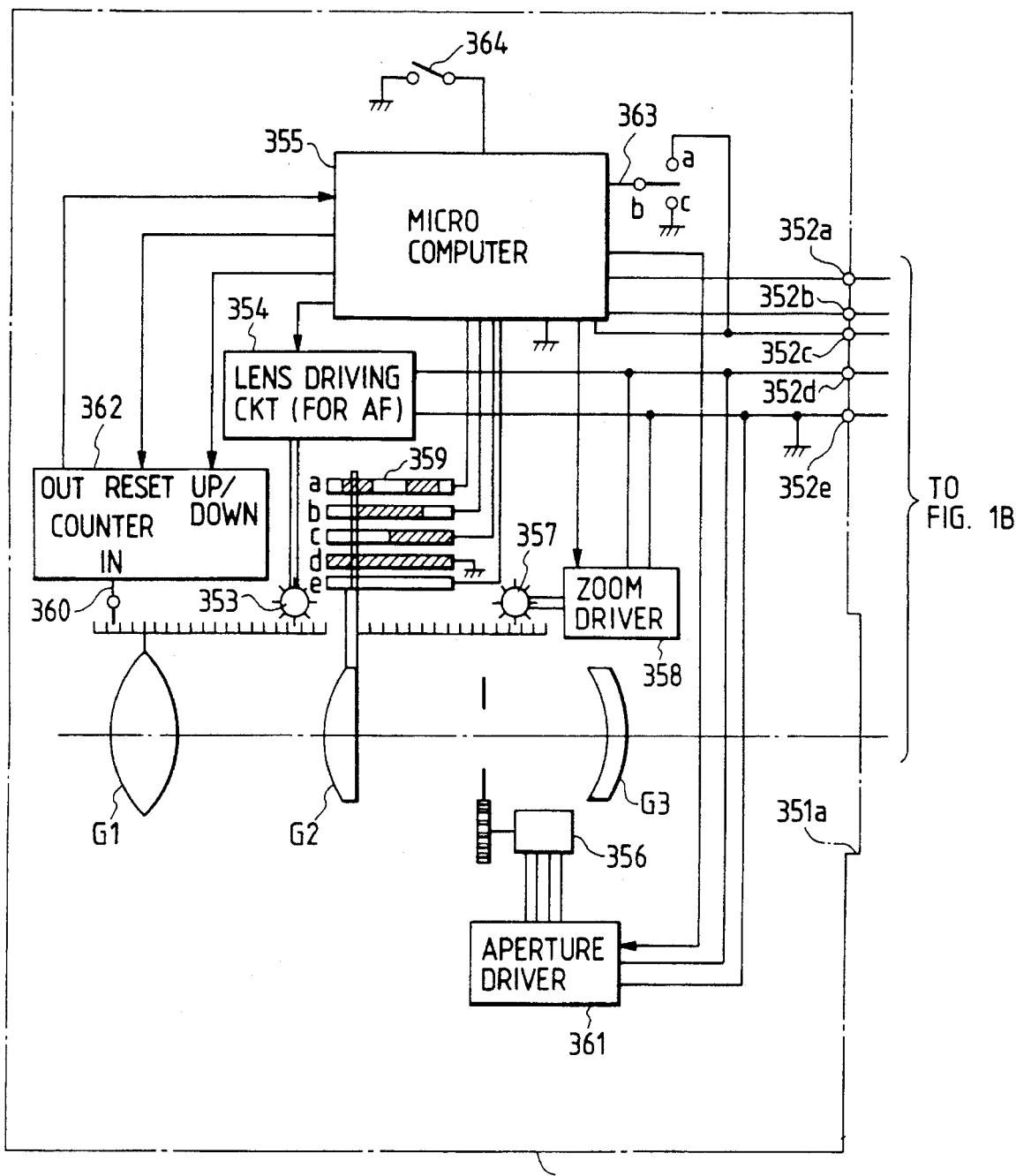

|  | EFFECTIVE FNo | P1 | R1 | P2 | R2 |
|---|---|---|---|---|---|
| Z1 (WIDE ANGLE END) | 5.30 | 90 | 8.50 | 70 | 6.60 |
| Z2 | 5.50 | 93 | 8.50 | 72 | 6.55 |
| ⋮ | ⋮ | ⋮ | ⋮ | ⋮ | ⋮ |
| Z15 | 7.00 | 126 | 10.70 | 87 | 6.30 |
| Z16 (TELEPHOTO END) | 7.20 | 130 | 10.80 | 90 | 6.25 |

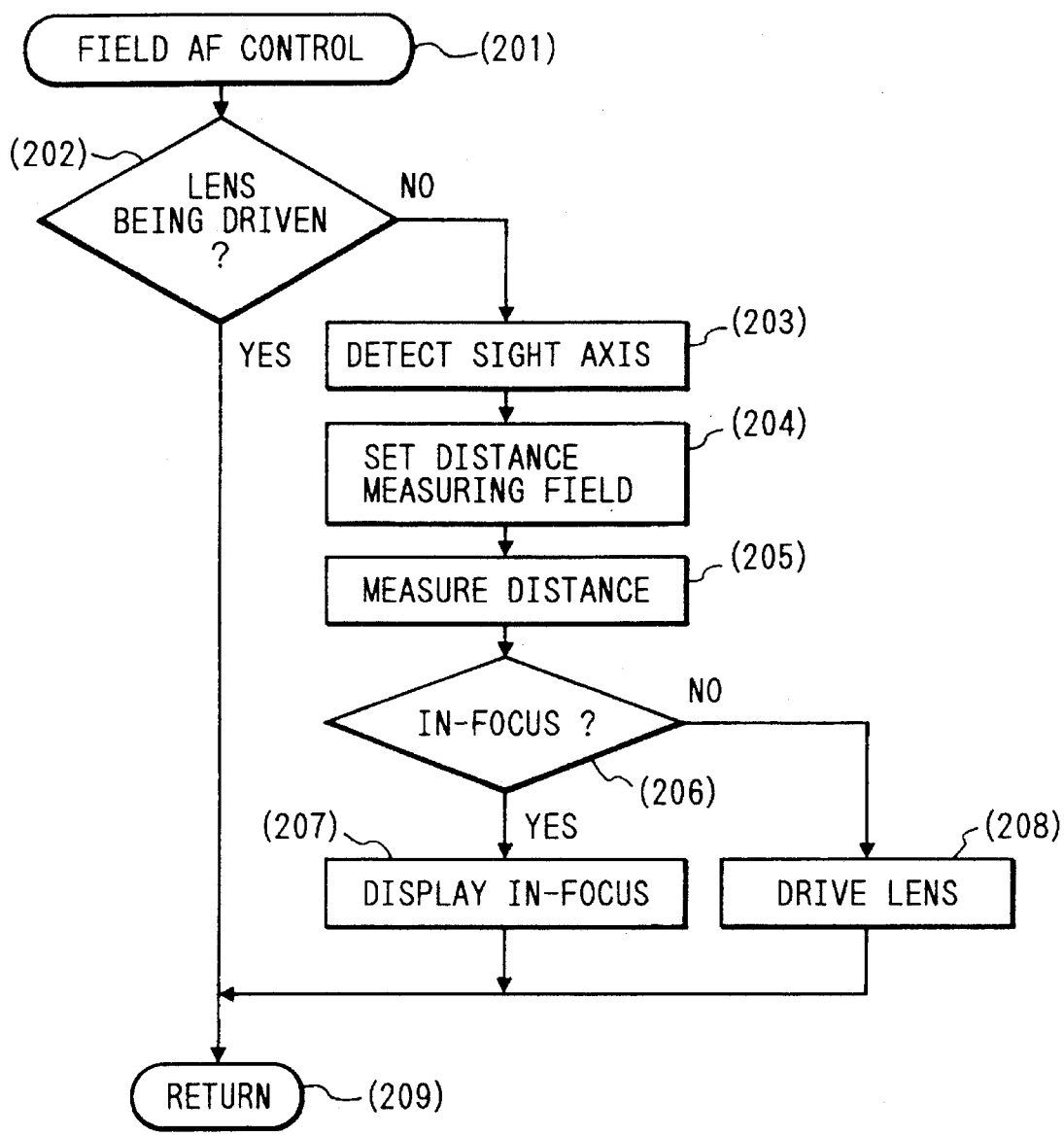

CAMERA HAVING A MULTI-POINT FOCUS DETECTING DEVICE

BACKGROUND OF THE INVENTION

1. Field of the Invention

This invention relates to a camera provided with focus detecting means having a plurality of distance measuring fields and for detecting the imaged states of object images having a variation occurring in the relative spacing therebetween on the basis of the photoelectric conversion outputs of the object images in conformity with the imaging state of an imaging optical system, and distance measurement propriety judging means for judging on the basis of the output from exit window output means whether the distance measuring light beam of each distance measuring field of said focus detecting means is eclipsed by the imaging optical system.

2. Description of the Related Art

Heretofore, in a lens interchange type camera, or camera system, provided with a focus detecting device of the phase difference detection type on the camera body side, for example, the fully open F number information of a photo-taking lens has been transmitted from the photo-taking lens to the camera body to thereby judge the presence of the eclipse of a distance measuring light beam and judge whether the focus detecting device is operable.

However, a popular photographic photo-taking lens has non-paraxially two exit windows (exit pupils) as is suggested by the fact that a decrease in a pupil area called aperture eclipse occurs at the image plane position off the optical axis. Accordingly, for a distance measuring field off the optical axis of the photo-taking lens, it is difficult to judge simply from the fully open F number information whether a distance measuring light beam is included in a photographing light beam. So, in the construction of the focus detecting device, it has been necessary to consider the exit windows of all photo-taking lenses mounted and set the distance measuring light beam so that an eclipse may not occur.

However, with the recent downsizing of photo-taking lenses, the location of the exit window has a strong tendency to become close to the predetermined imaging plane and on the other hand, with the higher magnification of zoom ratio, the location of the exit window has a tendency to become far from the predetermined imaging plane. In addition, the distance measuring field of the focus detecting device which has heretofore been only on the optical axis of the photo-taking lens has also come to be disposed off the optical axis and it has become more severe to ensure the absence of the eclipse of the distance measuring light beam for all photo-taking lenses and all distance measuring fields as described above.

In a camera having a conventional focus detecting device, a distance measuring field frame has been integrally formed on a focusing screen or a liquid crystal display element has been disposed adjacent to the focusing screen, and this liquid crystal display element has been electrically driven to thereby display the location of the distance measuring field over the object image within a finder field.

Now, as previously described, a popular photographic photo-taking lens has non-paraxially two exit windows as is suggested by the fact that a decrease in pupil area called aperture eclipse occurs at the image plane position off the optical axis. With the recent downsizing of photo-taking lenses, the location of the exit window has a strong tendency to become close to the predetermined imaging plane and on the other hand, with the higher magnification of zoom ratio, the location of the exit window is in a tendency to become far from the predetermined imaging plane.

In conformity therewith, in a lens interchange type camera (system) provided with a focus detecting device of the phase difference detection type on the camera body side of a photo-taking lens, for a distance measuring field lying off the optical axis of the photo-taking lens, it has become necessary to judge the presence of the eclipse of a distance measuring light beam, discriminate whether the focus detecting device is operable, and suitably render a particular distance measuring field inoperative.

However, in the conventional distance measuring field display, the operative states of respective distance measuring fields are not displayed, and this has led to a problem that the photographer cannot recognize which distance measuring field can be used.

SUMMARY OF THE INVENTION

One aspect of the application is providing a camera which can practically, sufficiently, and accurately accomplish a judgment regarding the eclipse of a distance measuring light beam while suppressing the amount of exit window information small.

Another aspect of the application is providing a camera which enables the photographer to easily recognize the distance measurement propriety states of distance measuring fields.

Another aspect of the application is providing a camera which is provided with exit window output means for outputting information regarding an exit window with respect to a point on the predetermined imaging plane lying at a predetermined distance from the optical axis of an imaging optical system and in which whether the eclipse of a photometric light beam occurs in each of a plurality of distance measuring fields is discriminated by the exit window information.

Yet another aspect of the application is providing a camera in which provision is made of indicating means for indicating distance measuring field frames corresponding to the plurality of distance measuring fields of a focus detecting device in the image field within a finder, and indication control means for driving said indicating means in accordance with the result of the judgment by distance measurement propriety judging means and selectively indicating the distance measurement field frames, and the distance measurement propriety states of the respective distance measuring fields are indicated by said indicating means.

Other objects of the present invention will become apparent from the following detailed description of embodiments of the invention taken in conjunction with the accompanying drawings.

BRIEF DESCRIPTION OF THE DRAWINGS

FIG. 20 is a flow chart showing the "sight axis and distance measuring field indicating" subroutine of FIG. 18.

DESCRIPTION OF THE PREFERRED EMBODIMENTS

Figure 1B:
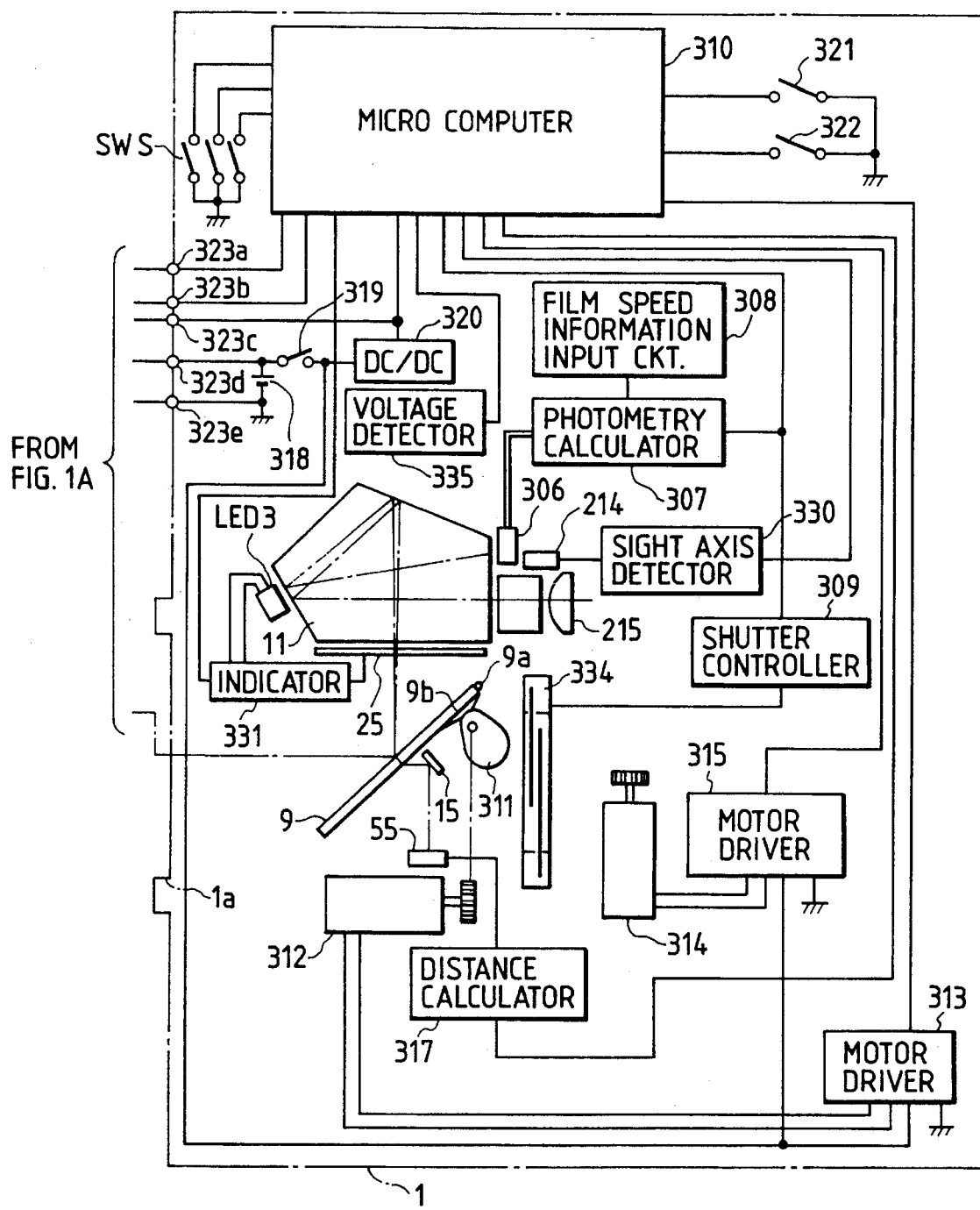
FIG. 1 is comprised of FIG. 1A and FIG. 1B, diagrammatically showing portions of a single-lens reflex camera (a camera body and a photo-taking lens) according to an embodiment of the present invention.

FIGS. 1A and 1B diagrammatically show the construction of portions of a single-lens reflex camera according to an embodiment of the present invention.

In FIGS. 1A and 1B, the reference numeral 1 designates a camera body and the reference numeral 2 denotes an interchangeable type photo-taking lens removably mounted on the camera body 1. These are coupled together by a camera mount 1a and a lens mount 351a.

In the camera body 1, the reference numeral 9 designates a movable half mirror, the reference character 9a denotes the rotary shaft of the mirror 9, the reference character 9b designates an actuating pin, the reference numeral 11 denotes a pentagonal prism, the reference numeral 215 designates an eyepiece, and the reference numeral 306 denotes a light receiving element for photometry. The reference numeral 307 denotes a photometry calculation circuit connected to a film speed information input circuit 308, a shutter control circuit 309 and a microcomputer 310. The reference numeral 334 designates a focal plane shutter, the reference numeral 311 denotes a mirror driving cam opposed to the rotary shaft 9a of the mirror and the actuating pin 9b, the reference numeral 312 designates a mirror driving motor connected to a motor drive circuit 313, and the reference numeral 314 denotes a film winding and rewinding motor connected to a motor drive circuit 315, like the mirror driving motor 312. The reference numeral 55 designates a distance measuring sensor connected to a distance calculating circuit 317, the reference numeral 214 denotes a photoelectric conversion element such as a CCD connected to a sight axis detecting circuit 330, and the reference numeral 25 designates an indicating element connected to an indicating circuit 33 together with an LED3, etc.

The reference numeral 318 denotes a battery for operating the entire camera system, the reference numeral 319 designates a main power source switch, and the reference numeral 320 denotes a DC/DC converter connected from the battery 318 to the microcomputer 310. The reference numeral 321 designates a switch for photometry and distance measurement, and the reference numeral 322 denotes a release switch. These switches generally are two-stage stroke switches, and the switch 321 is adapted to be closed by the first stroke of a release button, and the release switch 322 is adapted to be closed by the second stroke of the release button. SWS designates a switch connected to a setting dial, a mode selecting member and a distance measuring field fixing mode button which will be described later.

The reference characters 323a–323e denote a group of contact pins on the camera body 1 side installed near the mount 1a. The reference characters 352a–352e designate a group of contact pins on the photo-taking lens 2 side opposed to the group of contact pins 323a–323e on the camera body 1 side.

On the photo-taking lens 2 side, G1, G2 and G3 denote photographing optical lenses. The reference numeral 353 designates a lens driving motor used for focus adjustment and connected to a lens driving circuit 354. By the rotation of the lens driving motor 353, a pulse number is input to a counter 362 through a ratchet 360. The reference numeral 361 denotes an aperture driving circuit connected to a microcomputer 355 and to a pulse motor 356, by which the aperture is driven. The reference numeral 357 designates a zoom driving motor used during zooming and connected to a zoom driving circuit 358. The reference characters 359a–359e denote encoders for transmitting the focal length of the lens to the microcomputer 355, and the reference numeral 363 designates a power zoom switch. The reference numeral 364 denotes a changeover switch for changing over AF priority and power zoom priority. The changeover switch 364 prohibits the zoom driving driving focus in the AF priority state, and prohibits the focus driving during zoom driving in the power zoom priority state.

Figure 2:
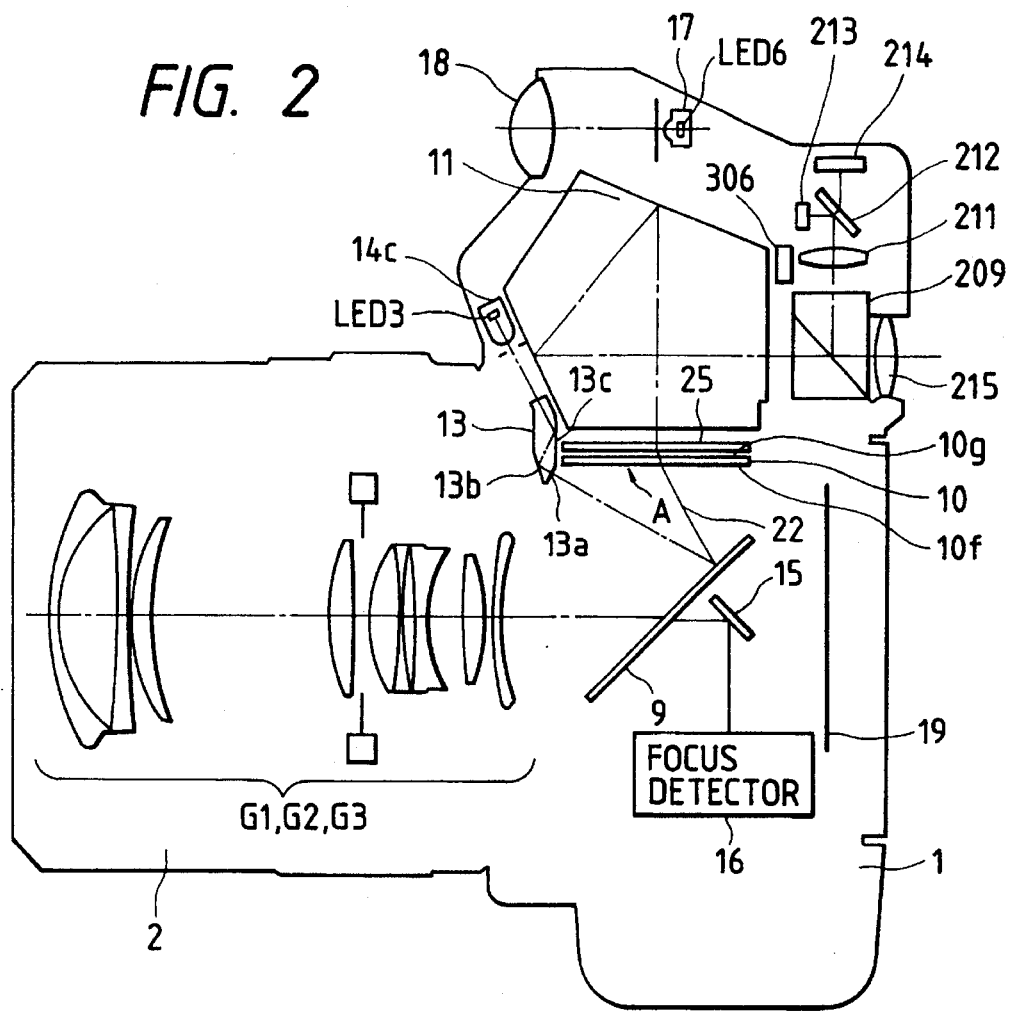
FIG. 2 shows the arrangement of the optical system of the single-lens reflex camera of FIG. 1.
Figure 3:
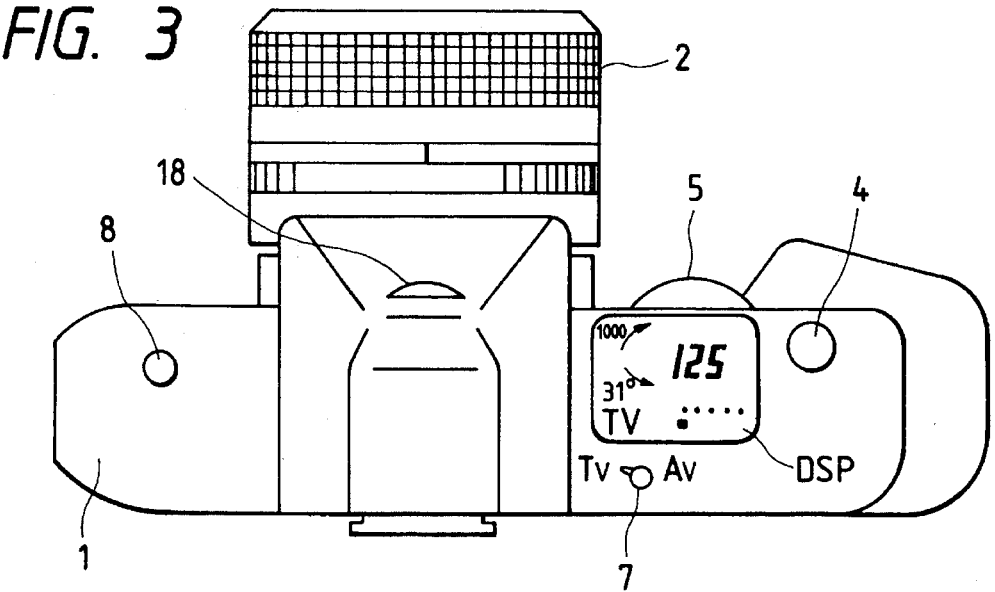
FIG. 3 is a top plan view of the single-lens reflex camera of FIG. 1.

FIGS. 2 and 3 are a cross-sectional view and a top plan view, respectively, of the auto-focus camera of which portions are shown in FIG. 1. The constituent elements overlapping those in FIG. 1 will also be described here.

In these figures, the reference numeral 1 designates a camera body, the reference numeral 2 denotes a photo-taking lens having optical lenses G1, G2 and G3, the reference numeral 4 designates a release button for operating switches 321 and 322, the reference numeral 5 denotes a setting dial operable by the index finger of the right hand, DSP designates a liquid crystal display device connected to an indicating circuit 331 together with an indicating element 25, and the reference numeral 7 denotes a mode selecting member for selecting one of the shutter time priority mode and the aperture value priority mode. The reference numeral 8 designates a distance measuring field fixing mode button, upon the operation of which the distance measuring field is input and set by the setting dial 5. The reference numeral 9 denotes a movable half mirror.

The reference numeral 10 designates focusing glass having a Fresnel lens 10f on the light entrance surface thereof and a mat surface 10g on the light exit surface thereof, the reference numeral 25 denotes an indicating element provided with a diffraction grating, the reference numeral 209 designates a beam splitter reflecting infrared and transmitting visible light therethrough, the reference numeral 11 denotes a pentagonal prism, and the reference numeral 215 designates an eyepiece. These elements together constitute a finder system.

The reference numeral 13 denotes a light projecting lens for the active type superimpose indication, the reference character 13a designates a Fresnel lens and the reference characters 13b and 13c denote total reflection surfaces. LED3 designates a red light emitting diode for indication, and the reference character 14c denotes a package for holding the LED3.

Light emitted from the LED3 is directed toward the focusing glass 10 by the light projecting lens 13 and the movable half mirror 9, and illuminates the central portion of the indicating element 25. Also, in the direction of the LED3 perpendicular to the plane of the drawing sheet, LED1, LED2, LED4 and LED5 are disposed so as to illuminate the marginal portion of the indicating element (see FIG. 15 which will be described later).

The reference numeral 16 denotes a focus detecting device of the phase difference detection type containing the distance measuring sensor of FIG. 1 therein. The focus detecting device 16 has five distance measuring fields at a location corresponding to the distance measuring field frame by superimpose indication which will be described later, and the object light transmitted through the movable half mirror 9 is directed to the focus detecting device 16 via a sub-mirror 15 disposed behind the movable half mirror 9. LED6 designates a near infrared light emitting diode, and with an auxiliary light projecting lens 18, it constitutes an auxiliary light device for distance measurement, and forms a part of the focus detecting device 16. The reference numeral 17 denotes a package for holding the LED6.

The reference numeral 211 designates a condensing lens, the reference numeral 212 denotes an infrared half mirror having a reflectance of 50% for infrared light, the reference numeral 213 designates an infrared light emitting diode, and the reference numeral 214 denotes a photoelectric conversion element such as a CCD. With the sight axis detecting circuit 330 of FIG. 1, these constitute a sight axis detecting system.

The construction of the focus detecting device 16 of the phase difference detection type will now be described in detail.

Figure 4:
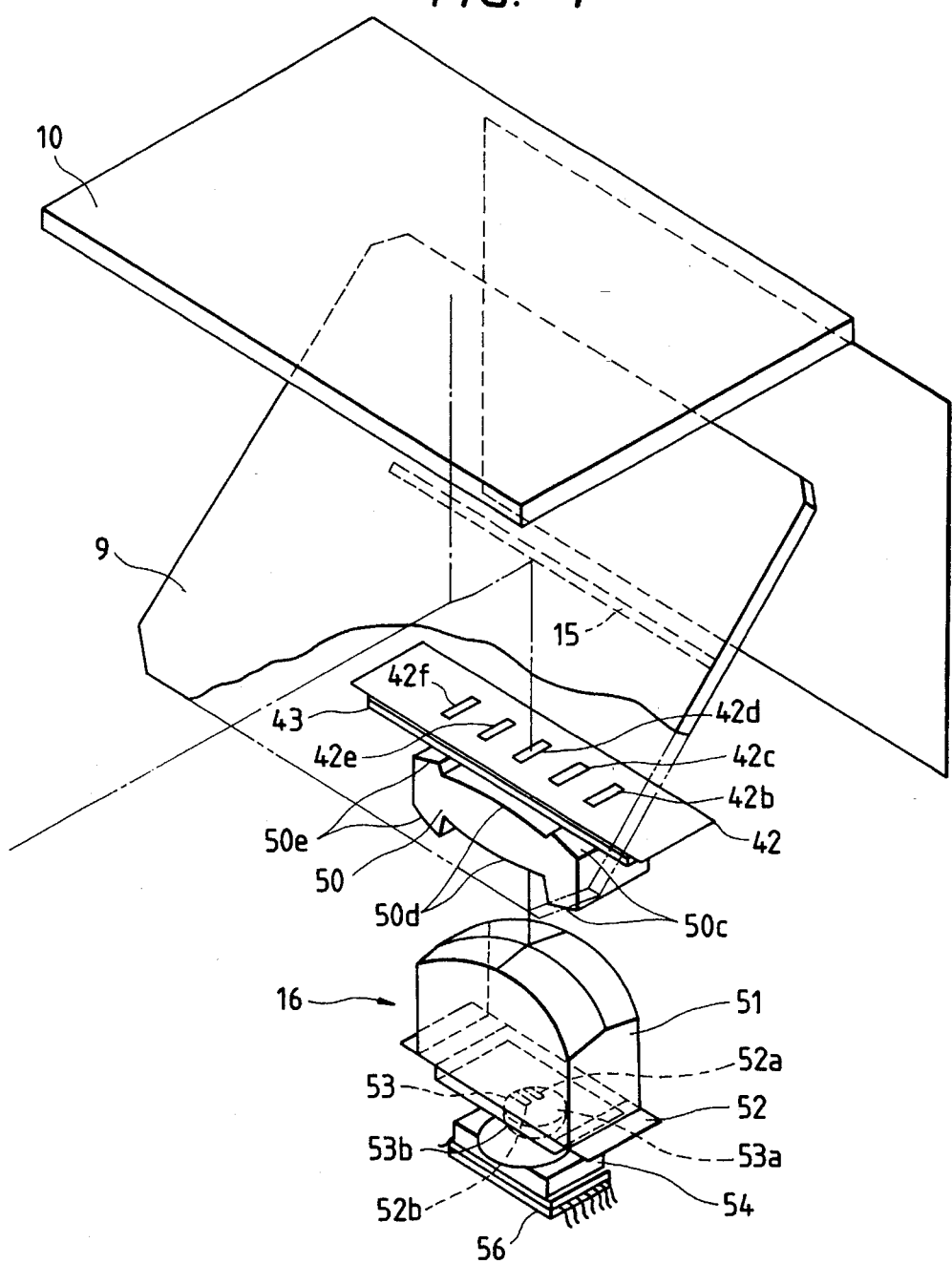
FIG. 4 is a perspective view of the focus detecting device of the single-lens reflex camera of FIG. 1.
Figure 5:
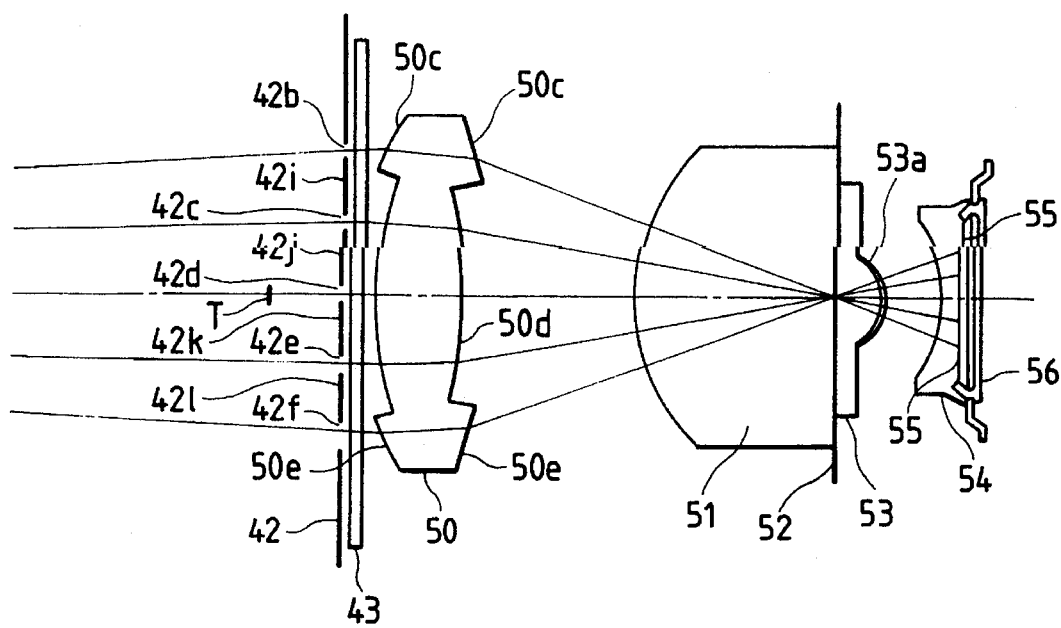
FIG. 5 is a cross-sectional view of the focus detecting device of FIG. 4.
Figure 10:
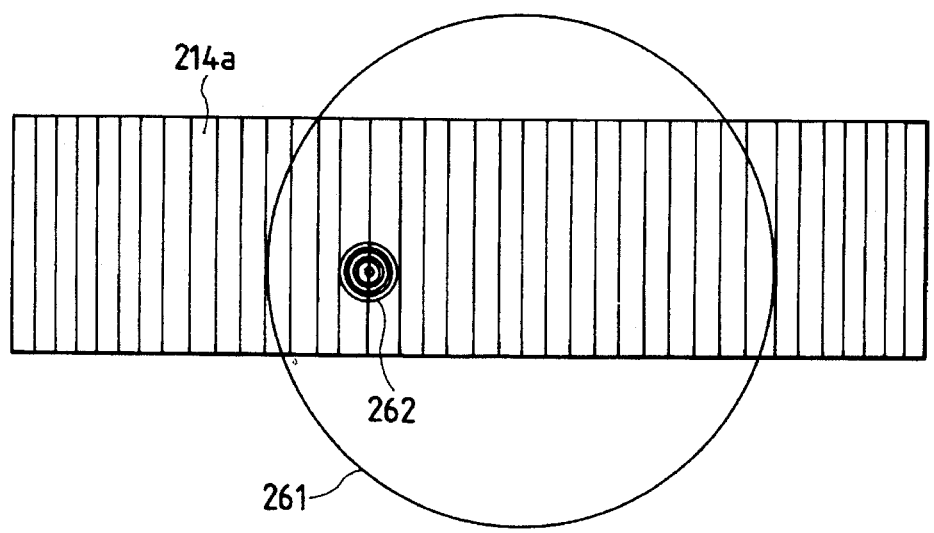
FIG. 10 shows the relation between a photoelectric conversion element in the sight axis detecting device of FIG. 9 and a pupil image projected thereon.

FIG. 4 is a perspective view of the focus detecting device 16, FIG. 5 is a longitudinal cross-sectional view thereof, and FIG. 10 shows the positional relation between the picture element array of a photoelectric conversion element comprising a single chip and the distribution of quantity of light.

Figure 6:
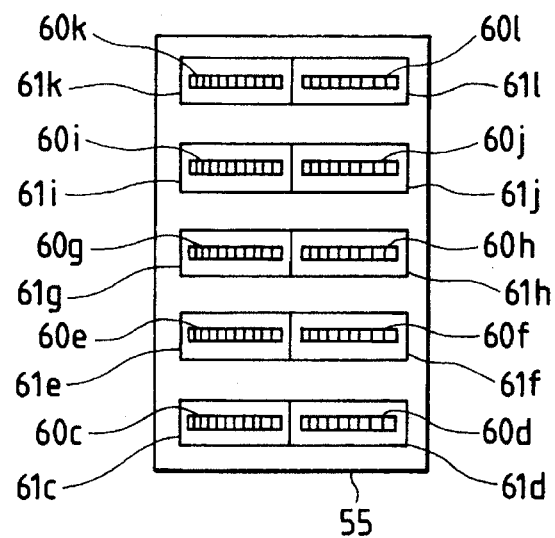
FIG. 6 shows the relation between the photoelectric conversion element of the focus detecting device of FIG. 4 and a field mask image.

In FIGS. 4 to 6, the reference numeral 42 designates a multi-aperture field mask having longer sides in the lateral direction and is provided with juxtaposed rectangular openings, and is disposed, for example, near the predetermined imaging plane of the interchangeable lens 2 which is the photo-taking lens of FIG. 1. The reference numeral 43 denotes a filter for intercepting light of any wavelength longer than that of near infrared light, and the reference numeral 50 designates a split field lens disposed in somewhat deviated relationship with the predetermined imaging plane of the objective lens and comprising lens portions 50c, 50d and 50e differing in optical action from one another. These portions are constituted by changing one or both of the lens thickness and the radius of curvature of the lens surface. Where the lens portions are constructed discretely from one another, they can be made of materials differing in refractive index.

The reference numerals 51 and 53 denote convex lenses forming a re-imaging lens unit with a two-aperture stop 52 interposed therebetween. The convex lens 51 and the two-image forming lens 53 comprising two convex lenses 53a and 53b (see FIG. 4) cemented together have the function of forming two secondary images of the object image formed by the objective lens. The aforementioned two-aperture stop 52 has vertically long elliptical openings 52a and 52b arranged in the lateral direction as viewed in FIG. 4.

The reference numeral 54 designates a concave lens for correcting curvature of the image field. The concave lens 54 is disposed on a transparent plastic package 56 containing a photoelectric conversion element 55 (see FIG. 6) therein. Although the split field lens 50, the convex lens 51 of the re-imaging lens unit and the concave lens 54 are made vertically long, any of them is a rotation-symmetrical spherical lens system.

Light beams passed through openings 42b–42f in the multi-aperture field mask 42 are transmitted through the lens portions 50c, 50d and 50e of the split field lens 50 as shown in FIG. 5, and form the secondary images of an object on the photoelectric conversion element 55.

Referring to FIG. 6 which shows this state, 60c and 60d, 60e and 60f, 60g and 60h, 60i and 60j, and 60k and 60l denote sets of picture element arrays comprising a number of picture elements, and the images 60c–61l of the openings 42b–42f in the multi-aperture field mask 42 are projected correspondingly to these picture element arrays, and the secondary images of the object are formed therein. In that case, the widths of the openings in the multi-aperture field mask 42 and the light intercepting zones 42i–42l between the openings are set in conformity with the widths and pitch of the picture element arrays on the photoelectric conversion element 55, thereby preventing a part of the light beam emerging from predetermined one of the openings from entering the other picture element arrays than the picture element array corresponding to said predetermined opening at one to one. Also, two field mask images per opening in the multi-aperture field mask 42 are formed side by side in the lateral direction by the actions of the stop openings 52a, 52b and lens portions 53a, 53b, and in the relation of the object image to the predetermined imaging plane, the secondary images of the object therein both move in the direction of arrow A and the direction of arrow B. Accordingly, each set of picture element arrays can detect the relative interval between the distributions of quantity of light regarding the secondary images forming a pair, on the basis of the output of the photoelectric conversion element 55, thereby knowing the focus state of the photo-taking lens 2 with respect to a plurality of distance measuring positions.

If the picture element arrays are made into a shape conforming to the distortion of the field mask image and design is made such that the directions of movement of said secondary images completely coincide with the direction of the picture element arrays, the distance measuring field on the predetermined imaging plane will become a straight line, and this is convenient to form a distance measuring field frame which will be described later.

As shown above, in the focus detecting device 16 of the phase difference detection type, it is a necessary condition for focus detection to form a pair of object images varying in phase in conformity with the imaging state of the photo-taking lens 2. Accordingly, if even a part of this light beam is eclipsed, the similarity of two images will be reduced and the result of focus detection will become unreliable.

Description will now be made of the information of the photo-taking lens 2 for judging whether focus detection is possible.

Figures 7, 8:
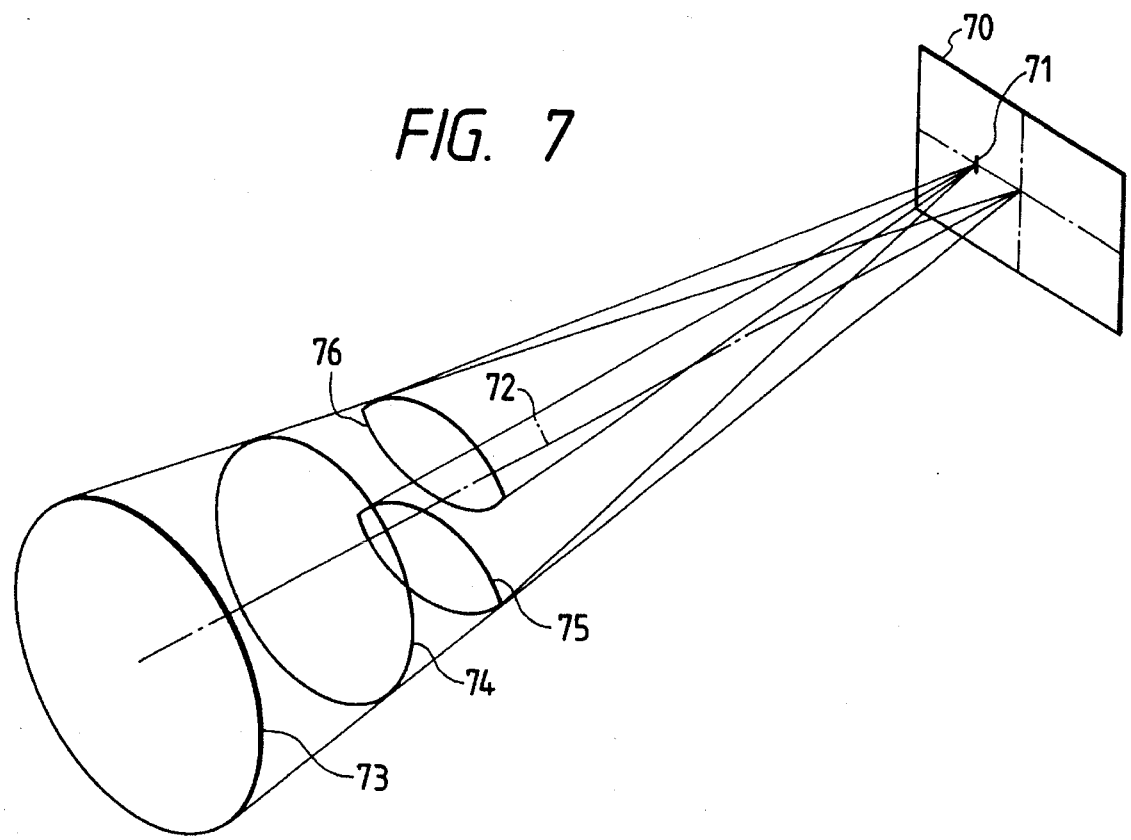
FIG. 7 is a perspective view showing the relation between the distance measuring light beam of the focus detecting device of FIG. 4 and the photographing light beam of a photo-taking lens.
FIG. 8 shows an example of exit window information in an embodiment of the present invention.

Referring to FIG. 7 which shows the relation between the photo-taking lens 2 and the distance measuring light beam in a developed manner, the reference numeral 70 designates a photographing image field, and the reference numeral 71 denotes a distance measuring field located off the optical axis 72 of the photo-taking lens 2. The distance measuring light beam entering this distance measuring field 71 is determined by the two-aperture stop 52 and split field lens 50 shown in FIG. 4, and in FIG. 7, the reference numerals 75 and 76 designate images formed by the two-aperture stop 52 being reversely projected by the split field lens 50 through one opening in the field mask 42.

Now, the photographing light beam not only differs depending on the aperture value, the interchangeable photo-taking lens, the zoom position and the position of a distance ring, but also varies for the position in the photographing image field and varies greatly particularly in the fully open aperture state in which distance measurement is effected. This means that the case with which the distance measuring light beam is eclipsed differs depending on the location of the distance measuring field.

Generally, if in the fully open aperture state of a photo-taking lens for a camera, the distance between a point on the photographing image field and the optical axis of the photo-taking lens is determined, the exit windows of the photo-taking lens for this point can be defined by two circles centering around the optical axis. In FIG. 7, the reference numerals 73 and 74 designate the exit windows, and FIG. 7 represents the state in which the object light arrives at a point on the distance measuring field 71 through these exit windows. Accordingly, whether the distance measuring light beam in the distance measuring field 71 is not eclipsed and distance measurement is possible is whether the distance measuring light beams forming the reversely projected images 75 and 76 can obliquely pass through the exit window given for each point on the distance measuring field. That is, when the image 75 is extended toward the exit windows 74 and 73, if the image 75 is of a size within the windows 74 and 73, the distance measuring light beam will not be eclipsed.

As previously described, the exit windows vary in the various states of the photo-taking lens, and to control the distance measuring field of the camera appropriately in conformity with a photo-taking lens mounted on the camera, it is necessary that the information about the exit window adjacent to the photo-taking lens 2 be transmitted to the camera body 1 side and the propriety of distance measurement with respect to each distance measuring field be judged.

FIG. 8 shows an example of the exit window information of the photo-taking lens 2 for this.

In FIG. 8, $Z_1$-$Z_{16}$ are the representative values of the focal length range divided into sixteen, parts, and $Z_1$ is the wide-angle end and $Z_{16}$ is the telephoto end. Effective FNo is the effective F number in the distance ring position in which the lens becomes darkest within this focal length range. $P_1$ and $R_1$ are the distance from the predetermined imaging plane and radius, respectively, of one of two circles determining the exit windows at a location of "11 mm" from the optical axis of the photo-taking lens 2 which is farther from the predetermined imaging plane, and $P_2$ and $R_2$ are the distance from the predetermined imaging plane and radius, respectively, of the other circle.

The information at the location of "11 mm" (exit window information $P_1$, $R_1$, $P_2$, $R_2$) is not merely the information for the distance measuring field lying at the location of 11 mm from the optical axis of the photo-taking lens (the outermost distance measuring field), but means that for all distance measuring fields lying in an area at least nearer to the optical axis than 11 mm, the result of the calculation for judging the presence or absence of eclipse of the distance measuring light beam which has been effected by the use of this value is completely reliable. As the setting of the distance measuring field position, it will be practically sufficient if the distance of the distance measuring field position from the optical axis is selected to the order of "11 mm".

As previously described, the microcomputer 355 recognizes the focal length range through the encoders 359a–359e in the photo-taking lens 2. Also, the exit window information of FIG. 8 is stored in an ROM in the microcomputer 355, and exit window information conforming to the circuit focal length is transmitted to the camera body 1.

The exit window information is not determined by only the focal length and the distance from the optical axis and therefore, the exit window information defined herein is the value for the imaginary position of the outermost distance measuring field in the divided focal length ranges and moreover in the distance ring position in which the effective F number becomes greatest in the whole distance range. Also, in a popular photo-taking lens, the effective F number becomes greatest when the distance ring position is the close distance. By having the exit window information in such a form, it can be obviated that the photo-taking lens is driven in accordance with the result of distance measurement and as a result, the effective F number becomes dark and distance measurement becomes impossible in this distance ring position. Also, if the exit window information is defined for the outermost distance measuring field, the actual exit window will include the window by the exit window information for more inner points and therefore, the eclipse of the distance measuring light beam will be judged on the basis of this exit window information, whereby at least, it is impossible that a case where actually the distance measuring light beam is eclipsed is judged as being not eclipsed.

As will be described later, in the sequence of the camera, this exit window information is repetitively transmitted from the photo-taking lens 2 to the camera body 1 and is used for the distance measurement propriety judgment of each distance measuring field and the indication of the distance measuring fields.

The principle of sight axis detection will now be described with reference to FIG. 9. For simplicity, this figure shows the optical path of the sight axis detecting system shown in FIG. 1, in a developed fashion.

Figure 9:
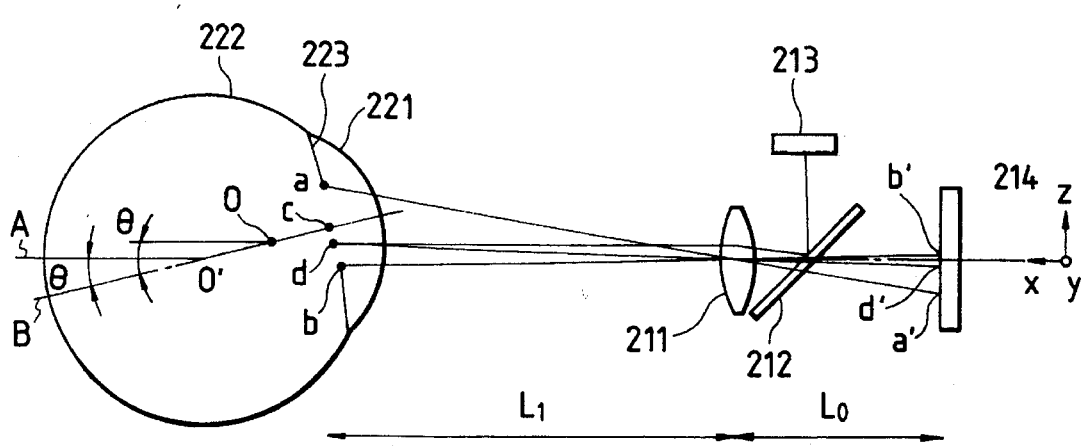
FIG. 9 is a view for illustrating a sight axis detecting device incorporated into an embodiment of the present invention.

In FIG. 9, the reference numeral 213 designates an infrared light emitting diode for projecting infrared light insensible to the observer. The infrared light emitting diode 213 is disposed on the focal plane of a condensing lens 211.

The infrared light projected from the infrared light emitting diode 213 is made into parallel light by the actions of the condensing lens 211 and eyepiece 215 (see FIG. 2) and illuminates the cornea 221 of an eyeball. At this time, the virtual image d of the infrared light emitting diode 213 formed by part of the infrared light reflected by the surface of the cornea 221 is created near an iris 223, is condensed again by the condensing lens 211, and a part of it is transmitted through a half mirror 212 and is imaged at a position d' on a photoelectric conversion element 214.

Also, light beams from the end portions a and b of the iris 223 form the images of these end portions a and b at positions a' and b' on the photoelectric conversion element 214 through the condensing lens 211. Where the rotation angle e of the optical axis of the eyeball with respect to the optical axis A of the condensing lens 211, when the Z coordinates of the end portions a and b of the iris 223 are Za and Zb, the coordinates Zc of the central position c of the iris 223 are expressed as $$Zc=(Za+Zb)/2.$$

Also, when the Z coordinates of the position d at which the reflected image of the cornea is created are Zd and the distance from the curvature center 0 of the cornea 221 to the center c of the iris 223 is OC, the rotation angle θ of the optical axis B of the eyeball substantially satisfies the following relational expression:

$$OC \times SIN\ \theta = Zc - Zd \qquad (1)$$

Here, the Z coordinates Zd of the position d of the reflected image of the cornea and the Z coordinates Zo of the curvature center 0 of the cornea 221 are coincident with each other. Therefore, by detecting the positions of unique points (the reflected image d of the cornea and the end portions a and b of the iris) projected onto the photoelectric conversion element 214, the rotation angle e of the optical axis B of the eyeball can be found. At this time, equation (1) is rewritten into $$\beta \times OC \times SIN\ \theta = (Za'+Zb')/2 - Zd', \qquad (2)$$

where β is a magnification determined by the distance L1 between the position d at which the reflected image of the cornea is created and the condensing lens 211 and the distance L0 between the condensing lens 211 and the photoelectric conversion element 214.

Although the principle of sight axis detection using the reflected image on the cornea 221, i.e., so-called Purkinje's first image, has been shown here, it is known that four images are formed from the structure of the human eye. However, the other images than Purkinje's first image are very low in intensity and are not a hindrance to the detection of the first image.

Description will now be made of the actual operation of the sight axis detecting system based on the above-described principle.

A simple construction using a one-dimensional photoelectric element array is shown below. FIG. 10 is a view for illustrating this, and as a result of the neglect of the longitudinal detecting capability, as shown in FIG. 10, there is provided an arrangement of photoelectric elements 214a which are vertically long, that is, of which the vertical width is several or more times as great as the lateral width, and this becomes almost insensible to the longitudinal parallel movement or rotation of the eyeball. However, a cylindrical lens can be adhesively secured to the front of the array of the photoelectric conversion elements 214a to obtain a similar effect.

Figure 11:
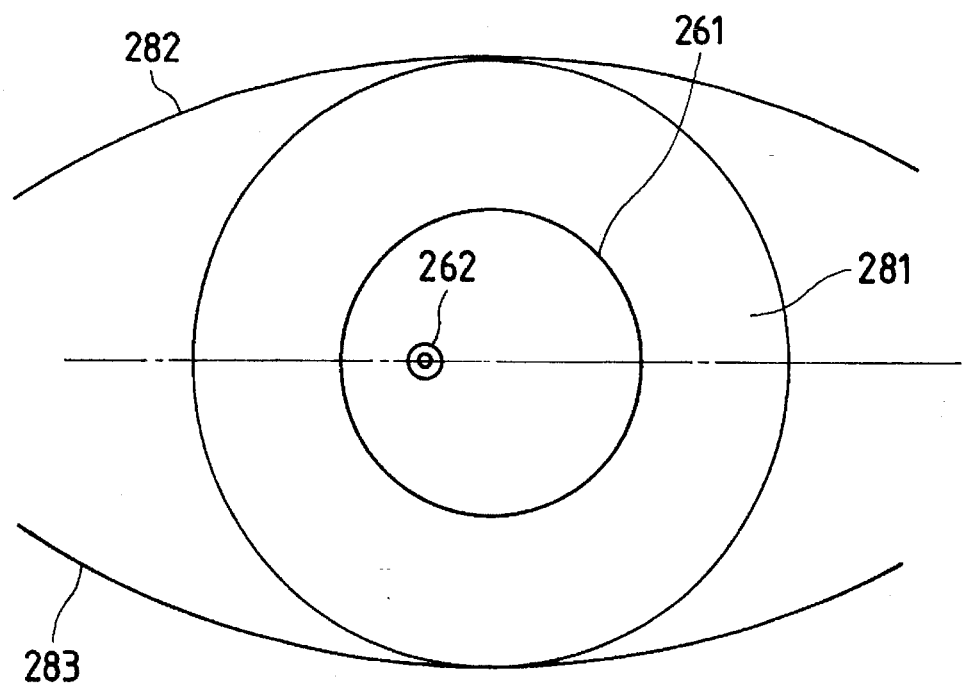
FIG. 11 is a front view of the photographer's eye illuminated by an LED in an embodiment of the present invention.
Figure 12:
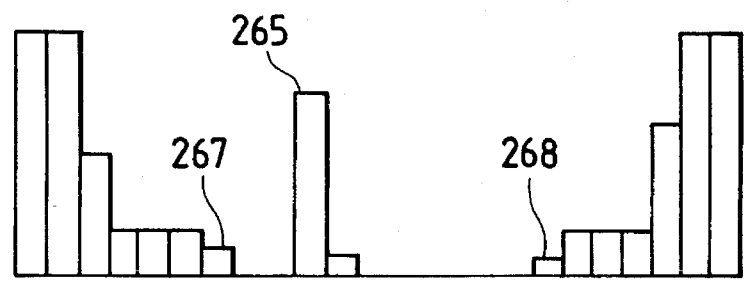
FIG. 12 illustrates the photoelectric conversion output when the illuminated state of the photographer's eye of FIG. 11 is photoelectrically converted.

When Purkinje's first image 262 shining in a pupil 261 shown in FIG. 11 and the pupil 261 are received by the one-dimensional photoelectric conversion element array 214a, there is obtained a photoelectric output as shown in FIG. 12.

In FIG. 12, the high output values on the opposite sides express the white of the eye, and a signal 265 corresponding to the Purkinje's first image is obtained in the dark pupil portion. Also, the center of the pupil is obtained from the positional information of edge portions 267 and 268. Most simply, in the edge portions, the positional coordinates of the center of the pupil given picture element numbers i1 and i2 producing an output approximate to the average half value of an iris portion 281 are given by $$i0=(i1+i2)/2.$$

The position of the Purkinje's first image 262 is formed from the maximum peak locally appearing in the dark portion of the pupil and therefore, from the relative positional relation between this position and the aforementioned center of the pupil, the situation of the rotation of the eyeball, and thus the direction of the sight axis can be known. In FIG. 11, the reference numerals 282 and 283 designate the upper and lower eyelids.

Design can be made such that when the distance measuring fields of the focus detecting device 16 are to be selected from the above-described sight axis detection output, one of the measurable distance measuring fields which is nearest to the sight axis position found as described above is selected.

The display device of the camera will now be described.

As the display device, there are provided an external display device using the liquid crystal display DSP shown in FIG. 3 and a display device in the finder.

Figure 13:
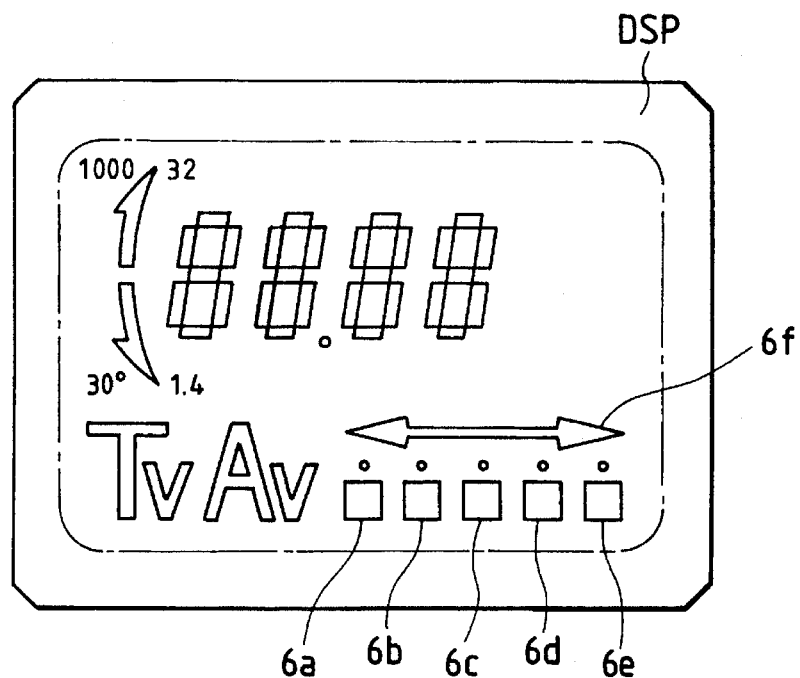
FIG. 13 is a view for illustrating the display by the external display device of the single-lens reflex camera of FIG. 1.

FIG. 13 is an enlarged view of the liquid crystal display DSP, and when the shutter time priority mode is selected by the mode selecting member 7 shown in FIG. 3, of the displays shown in FIG. 13, "Tv", two arrows "1000, 30", a four-figure segment indicating shutter time and selected one of distance measuring field position display elements 6a–6e are driven. On the other hand, when the aperture value priority mode is selected, "Av", two arrows, "32 1.4", a foure-figure segment indicating the aperture value and selected one of the distance measuring field position display elements 6a–6e are driven.

Also, when the distance measuring field fixing mode button 8 is depressed, the distance measuring field fixing mode is selected and "Tv" or "Av", a foure-figure segment, one of the distance measuring field position indicating elements 6a–6e selected by the setting dial 5 of FIG. 3 and an arrow 6f are driven.

The display in the finder will now be described.

Figure 14:
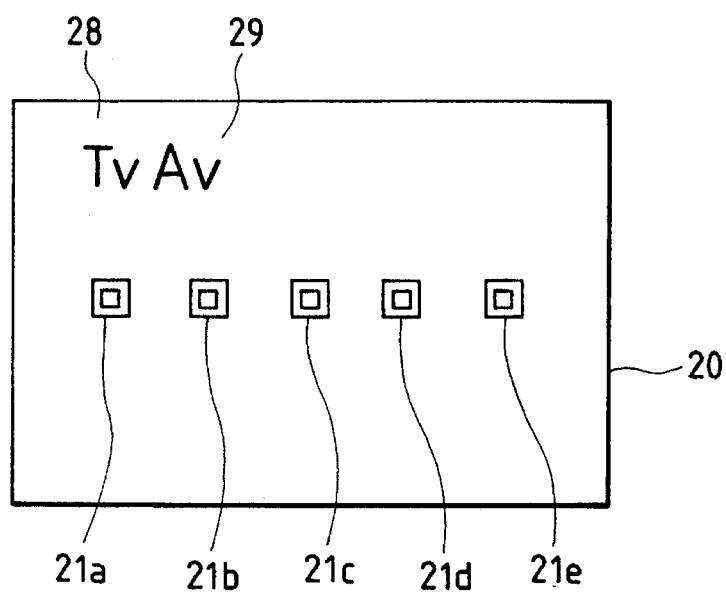
FIG. 14 is a view for illustrating the display in the finder of the single-lens reflex camera of FIG. 1.

FIG. 14 illustrates the distance measuring field frame superimpose-displayed in the finder field by an indication element 25 and the automatic exposure mode display.

In FIG. 14, the reference numeral 20 designates the finder field, the reference characters 21a–21e denote distance measuring field frames, and the reference numerals 28 and 29 designate Tv display representative of the shutter speed priority mode and Av display representative of the aperture priority mode, respectively. As will be described later, the distance measuring field frames 21a–21e are selectively changed in color by the illuminating light from an LED. Also, only one of the displays 28 and 29 is in its display state in accordance with the actually set state of the camera. Further, when the distance measuring field fixing mode button 8 of FIG. 3 is depressed, the Tv display 28 or the Av display 29 and one of the distance measuring field frames 21a–21e selected by the setting dial shown in FIG. 3 are driven.

Figure 15:
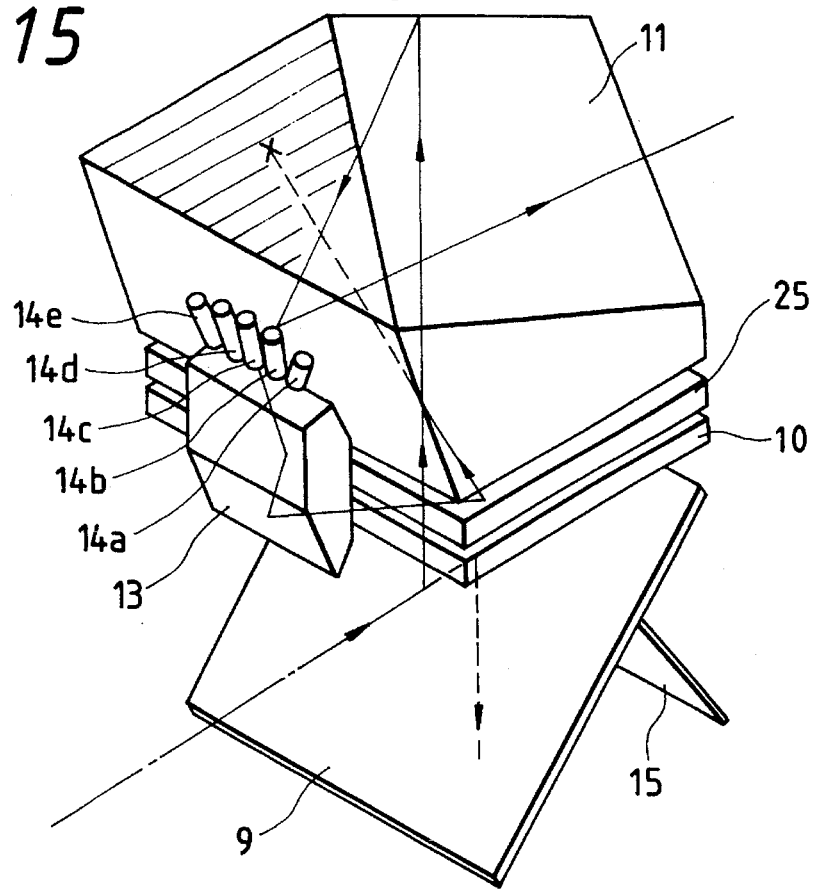
FIG. 15 is a perspective view of a display device in the finder of the single-lens reflex camera of FIG. 1.
Figure 16:
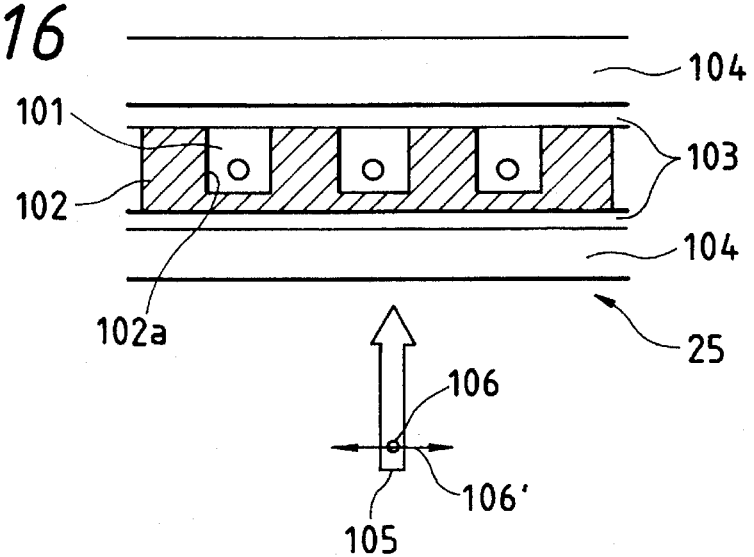
FIG. 16 illustrates the principle of the indication element of the display device in the finder shown in FIG. 15.

FIGS. 15 to 17 are views for specifically illustrating the principle of superimpose display.

In FIG. 15 which is a perspective view of the essential portions of the display device in the finder, the reference characters 14a–14e (including the package 14c shown in FIG. 2) designate packages for illuminating LED1–LED5, not shown r and these packages are designed to illuminate the distance measuring field frames 21a–21e, respectively, shown in FIG. 14.

On the display element 25, as shown in detail in FIG. 16, a display portion comprising a diffraction grating is formed at a location corresponding to the distance measuring field. FIG. 16 enlargedly shows the grating portion to facilitate the description of the construction of the diffraction gratings, but actually, the pitch of the grating is several μm and the thickness of the indication element 25 is of the order of 1 mm.

In FIG. 16, the reference numeral 104 designates a transparent substrate, the reference numeral 103 denotes electrodes in a direction perpendicular to the plane of the drawing sheet, and the reference numeral 105 designates incident light having polarized components. The reference numerals 106 and 106' denote polarized components orthogonal to each other in the incident light 105, and the polarized component 106 is a component in a direction perpendicular to the plane of the drawing sheet and the polarized component 106' is a component in a direction parallel to the drawing sheet.

An electric field is applied to liquid crystal 101 filling the recesses of the diffraction grating 102 through the transparent electrodes 103 provided in opposed relationship with each other on the opposite sides of the diffraction grating 102 to control the tilt angle of the liquid crystal 101, thereby creating a desired diffracting effect in the incident light 105 and effecting light modulation.

It is to be understood that in a static state in which no electric field is applied to the liquid crystal 101, the liquid crystal 101 maintains the state of homogeneous orientation in which, as shown in FIG. 16, it is disposed in the direction of the grating, i.e., in a direction perpendicular to the plane of the drawing sheet, in the recesses 102a of the diffraction grating 102. When the incident light 105 is incident on the indication element 25 in such static state, of the polarized components 106 and 106' of the incident light 105, the polarized component 106' orthogonal to the direction of orientation of the liquid crystal 101 senses the ordinary refractive index no of the liquid crystal 101 and the polarized component 106 parallel to the direction of orientation of the liquid crystal 101 senses the extraordinary refractive index ne of the liquid crystal 101.

If here, the refractive index of the substance forming the diffraction grating 102 is ng and the wavelength of the incident light 105 is λ and the thickness of the diffraction grating 102 is T, in the case of a rectangular diffraction grating, the diffraction efficiency ηo of 0-order transmitted diffracted light to each of the polarized components 106 and 106' of the incident light 105 is approximately represented by the following equation (3):

$$\eta o = \tfrac{1}{2} \cdot \{1 + \cos(2\pi \cdot \Delta n \cdot T/\lambda)\}, \qquad (3)$$

where Δn indicates the difference between the refractive index ng of the diffraction grating 102 and the refractive indes ne or no of the liquid crystal 101, and to the polarized component 106 of the incident light 105, Δn=|ne−ng|, and to the polarized component 106', Δn=|ng−no|. Accordingly, from equation (3), when Δn=0, that is, when ne=ng or no=ng, the diffraction efficiency ηo of the 0-order transmitted diffracted light is "ηo=1", and when $$\Delta n \cdot T = (\tfrac{1}{2} + m)\lambda, \text{ where } m = 0, 1, 2, 3, \ldots,$$

the diffraction efficiency is "ηo=0".

When an electric field is applied to the liquid crystal 101 through each transparent electrode 103, the direction of orientation (the direction of the optical axis) of the liquid crystal 101 changes gradually. However, the polarized component 106' of the incident light 105 always senses the ordinary refractive index no of the liquid crystal 101 independently of the application of the electric field.

In contrast, the polarized component 106 senses a combined refractive index ne which is the result of the combination of the extraordinary refractive index ne and ordinary refractive index no of the liquid crystal 101 at a predetermined ratio, in accordance with the amount of applied electric field. That is, the combined refractive index nθ changes with the change in the direction of orientation of the liquid crystal 101.

Further, when the amount of applied electric field is increased, the liquid crystal 101 is oriented perpendicularly to the substrate 104 (electrodes 103) and assumes a homeotropically oriented state. At this time, both of the polarized components 106 and 106' of the incident light 105 sense the ordinary refractive index no of the liquid crystal 101 and become saturated. In this state, the incident light 105 is diffracted, i.e., light-modulated, in accordance with equation (3).

The non-display state and the display state are changed over on the basis of such a principle, and in the non-display state, the indication element 25 is regarded as a transparent substrate of uniform refractive index and the object image formed on the focusing screen is not modulated, but passes intactly through the pentagonal prism 11 and the eyepiece 215 and is intactly formed on the retina of the observer's eye. On the other hand, in the display state, part of the light incident on the indication element 25 is diffracted by the diffraction grating portion which is a display pattern. A component of the diffracted light which is great in angle of diffraction is flown to the outside of the aperture of the eyepiece 215 and therefore is visually recognized as if part of the object light were decreased, and a display superposed on the object image is done.

Further, when illuminating LED1–LED5, not shown, held in the packages 14a–14e shown in FIG. 15 are caused to emit light, the light beams thereof pass through the light projecting lens 13 as shown in FIG. 2, are reflected by the movable half mirror 9, are deflected toward the focusing glass 10 and arrive at the indication element 25. Design is made such that at this time, due to the action of the Fresnel lens 13a of the light projecting lens 13, one display portion is illuminated by the light emission of the LED.

Figure 17A:
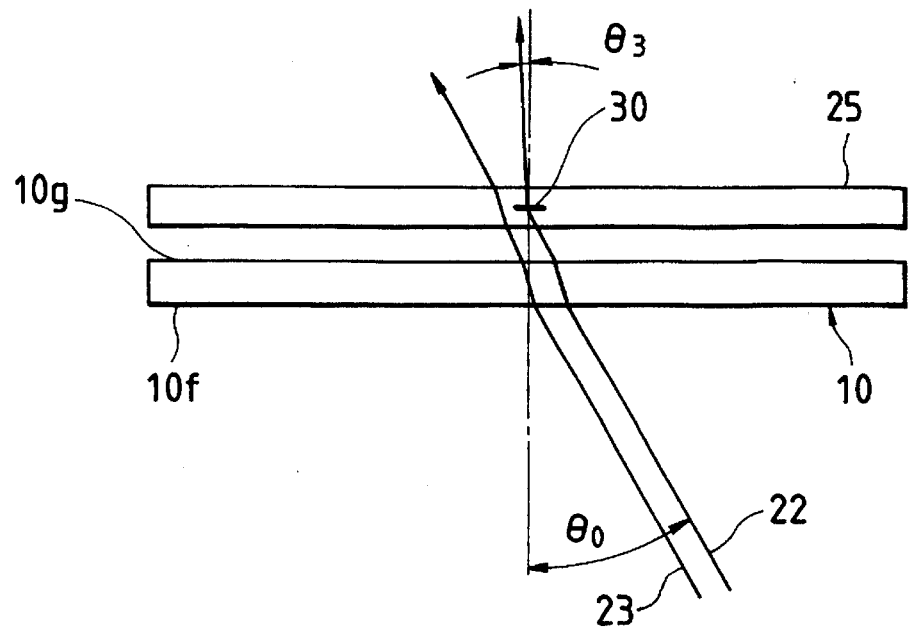
FIGS. 17A and 17B illustrate the principle of the active type color change display in the display device in the finder shown in FIG. 15.
Figure 17B:
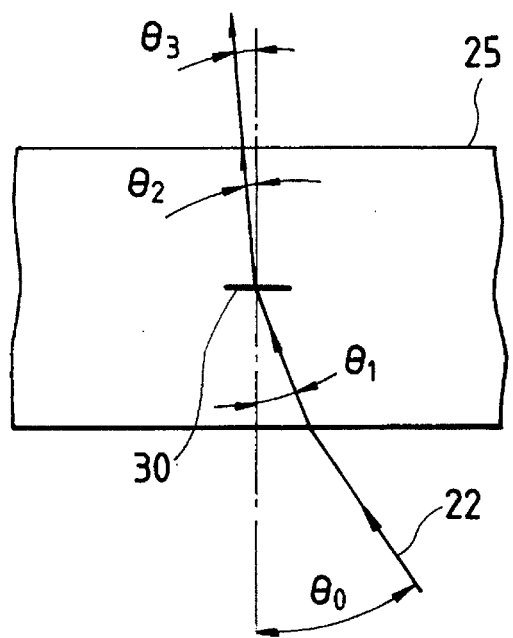

FIGS. 17A and 17B are detailed views of a portion A indicated by broken line in FIG. 2, and show the optical paths of illuminating lights from LED1–LED5 held in the packages 14a–14e.

In FIG. 17A, the reference numerals 22 and 23 designate the illuminating lights from LED3 in the package 14c and obliquely enter the indication element 25 from the movable half mirror 9. FIGS. 17A and 17B show a case where the display portion is in the display state by the application of an electric field, and the ray 22 incident on the diffraction grating 30 is diffracted there. Part of this diffracted light travels upwardly, while the ray 23 intactly travels toward the non-effective portion of the pentagonal prism 11.

Accordingly, if the indication element 25 is observed through the pentagonal prism 11 and eyepiece 215, when the indication element 25 is originally in the display state, there will be brought about a color change to the color of the emitted light of LED, and when the indication element 25 is in the non-display state, the illuminating light from LED will not be bent toward the eyepiece 215 and therefore will not be visually recognized. Thus, by the combination of the application of the electric field by the transparent electrodes 103 and the application of the illuminating light by LED, three operative states, i.e., the non-display state, the display state and the color change display state, can be controlled with respect to the respective distance measuring field frames.

FIG. 17B is a view for illustrating the manner of diffraction of the illuminating light in greater detail, and shows the behavior of the ray in the indication element 25.

In this figure, $\theta_0$ is the angle of incidence of the ray onto the indication element 25, $\theta_3$ is the angle of emergence of the ray from the indication element 25, $\theta_1$ is the angle of incidence of the ray onto the diffraction grating, and $\theta_2$ is the angle of emergence of the ray from the diffraction grating.

First, in the display element 25, mth-order diffracted light satisfies the following equation:

$$\sin \theta_2 - \sin \theta_1 = m\lambda/(dn), \quad (4)$$

where m: an integer;

$\lambda$: the wavelength of the illuminating light in the air;

n: the refractive index of the transparent substrate 104;

d: the pitch of the diffraction grating.

Also, the relations between $\theta_0$ and $\theta_1$ and between $\theta_2$ and $\theta_3$ are:

$$\sin \theta_0 = n\sin \theta_1 \quad (5)$$

$$\sin \theta_2 = n\sin \theta_3 \quad (6)$$

and when equations (5) and (6) are substituted for equation (4), there is obtained the following equation:

$$\sin \theta_0 - \sin \theta_3 = m\lambda/d \quad (7)$$

In the single-lens reflex camera as shown in FIG. 2, $\theta_0$ is about 30°, and if the wavelength $\lambda$ of LED is 650 mm and $\theta_3=0$ and m 32 1, d=1.3 nm. Accordingly, if the pitch of the diffraction grating is set to this value, 1st-order diffracted light will emerge toward the eyepiece 215 and the distance measuring frame being in the display state will be visually recognized as being tinged with red.

The operation of the camera will now be described with reference to FIGS. 18 to 20.

Figure 18:
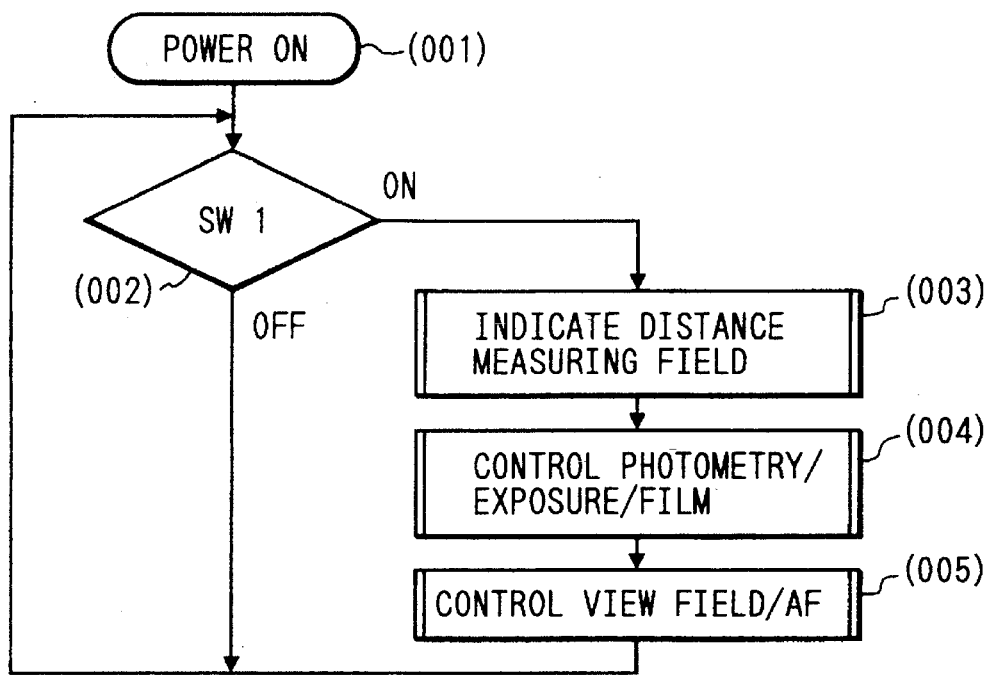
FIG. 18 is a flow chart showing the general operation of the single-lens reflex camera of FIG. 1.
Figure 19:
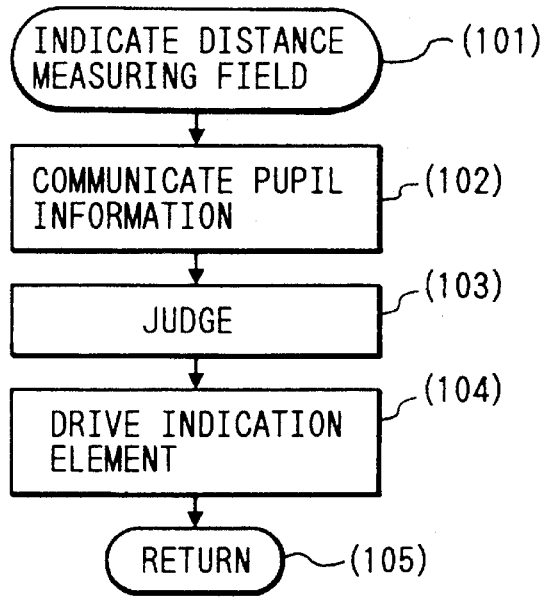
FIG. 19 is a flow chart showing the "distance measuring field indicating" subroutine of FIG. 18.

FIG. 18 is a flow chart showing the flow of the whole program stored in the microcomputer 310.

When the execution of the program is started by the operation of the switch 319, at a step (002), the state of the switch 321 (SW1) adapted to be closed by the first stroke of the release button is detected, and if this switch 321 is OFF, return is made to the step (002), where the detection by the release button is repeated. On the other hand, when the switch 321 becomes ON, shift is made to a step (003).

The step (003) is the "distance measuring field indicating" subroutine, in which the display of the distance-measurable distance measuring field frame and the indication of a selected distance measuring field are effected by the liquid crystal display DSP, the display element 25 and LED1–LED5.

The subsequent step (004) is the "photometry/exposure/film control" subroutine, in which a series of camera operations such as a photometry calculation process, exposure control and shutter change and film winding after exposure are performed. The "photometry/exposure/film control" subroutine bears no direct relation to the present invention and need not be described in detail, but yet the epitome of the function of this subroutine is as follows.

As long as the switch 321 is ON, this "photometry/exposure/film control" subroutine is executed, and each time it is executed, photometry and exposure control calculations and display are effected. When the release switch 322 (SW2) becomes closed by the second stroke of the release button, not shown, the release operation is started by the interrupt processing function of the microcomputer 310, and the aperture or shutter time is controlled on the basis of the exposure amount found by the above-mentioned exposure control calculation, and after the termination of exposure, shutter charge and film feeding operations are performed, whereby the exposure of one film frame is completed.

A step (005) is the "view field/AF control" subroutine, in which the detection of the sight axis of the photographer's eye by the sight axis detecting device, the focus detection in the distance measuring field selected in conformity with the position of the sight axis and the in-focus control of the photo-taking lens are effected.

When these series of processes are terminated, return is made to the step (002), where the detection of the switch 321 is effected again.

The "distance measuring field indicating" subroutine will now be described with reference to FIG. 19.

When this "distance measuring field indicating" subroutine is called, the communication of exit window information is first effected at a step (102) through a step (101). Specifically, $P_1$, $R_1$, $P_2$ and $R_2$ ($P_1$ and $R_1$ being the distance from the predetermined imaging plane and radius, respectively, of the circle farther from the predetermined imaging plane and $P_2$ and $R_2$ being the distance from the predetermined imaging plane and radius, respectively, of the other circle) corresponding to the current zoom position based on the focal length detected by the encoders 359a–359e are selected from among the data stored in the ROM contained in the microcomputer 355 in the photo-taking lens, are sent to the microcomputer 310 in the camera body 1 and the stored in the RAM therein.

At the subsequent step (103), the values of $P_1$, $R_1$, $P_2$ and $R_2$ are compared with the inherent distance measuring light beam information of the focus detecting device 16, whereby the eclipse of the distance measuring light beam is examined with respect to each distance measuring field, and the propriety of distance measurement is judged from the presence or absence of the eclipse. That is, whether the distance measuring light beam in each distance measuring field can pass through the exit windows 73 and 74 shown in FIG. 7 is examined and specifically, the passage ranges of the distance measuring light beams at the positions of $P_1$ and $P_2$ can be calculated and these ranges can be compared with the circles defined by $R_1$ and $R_2$. That is, whether the image ranges at the positions of $P_1$ and $P_2$ of the distance measuring light beams (reversely projected images) predetermined in the respective fields of view are within the circles defined by $R_1$ and $R_2$, respectively, is judged in each field of view except the central field of view, and distance measurement is judged to be impossible for the fields of view which are within the distance measuring light beam ranges off the above-mentioned circles.

At a step (104), the indication element 25 is driven in accordance with the result of the judgment at the previous step (103) so that the distance measuring field frames 21a–21e may be indicated only for the distance-measurable distance measuring fields (the details of this will be described later with reference to FIGS. 21 and 22). That is, only the field frames corresponding to the fields of view judged that distance measurement is possible are brought into the display state. However, when the distance measuring field fixing mode button 8 is being operated, the distance measuring field frame of one selected distance measuring field is driven. It is to be understood that if the selected field of view is a field of view judged that distance measurement is impossible, the indication of the field frame corresponding to that field of view is prohibited.

At a step (105), the subroutine is returned.

Since this subroutine is repetitively called in the sequence of the entire camera shown in FIG. 18, the latest zoom position is always checked up and the usable distance measuring field is indicated substantially on real time.

The "field/AF control" subroutine will now be described with reference to FIG. 20.

When this "field/AF control" subroutine is called, whether the lens for focus control is being driven is first examined at a step (202) through a step (201). If the lens is being driven, it means that the lens driving by the last "field/AF control" subroutine has not yet been terminated and therefore, shift is made to a step (209), where the subroutine is immediately returned. If the lens is not being driven, shift is made to a step (203).

At the step (203), the sight axis of the photographer's eye is detected by the sight axis detecting system.

At the subsequent step (204), the distance measuring field for effecting in-focus control is set on the basis of the result of the detection of the sight axis. As described with respect to the previous "distance measuring field indicating" subroutine, the distance measuring field frames 21a–21e corresponding to the distance-measurable distance measuring fields are indicated in the finder field 20, and one of these distance measuring fields which is most approximate to the result of the detection of the sight axis is selected (the details of this will be described later with reference to FIGS. 21 and 22). It is for permitting the focus detecting operation only when the photographer is looking into the finder that again in the distance measuring field fixing mode, this routine is passed through, and by doing this, a camera operation conforming to the photographers's will can be realized.

When the photographer is pursuing the distance-unmeasurable field frame which is not indicated in the finder with his sight axis, the selection of that field of view is prohibited and instead, the distance-measurable field of view nearest to that field frame is selected.

At a step (205), focus detection is effected for the object on the distance measuring field set at the previous step (204).

At the next step (206), in-focus or out-of-focus is judged. If out-of-focus is judged, shift is made to a step (208), where the photo-taking lens is instructed to be driven on the basis of the defocus amount. If in-focus is judged, advance is made to a step (207), where in-focus is displayed.

The in-focus display at the step (207) is effected by turning on one of LED1–LED5 shown in FIG. 1 which corresponds to-the set distance measuring field, and color-changing one of the distance measuring field frames 21a–21e of the indication element 25. This turn-on time may preferably be of the order of several tens of ms to several hundreds of ms in practices.

Finally, the indication in the finder in the operation of the camera shown in the above-described flow charts will hereinafter be described with reference to FIGS. 21A, 21B, 22A and 22B.

Figure 21A:
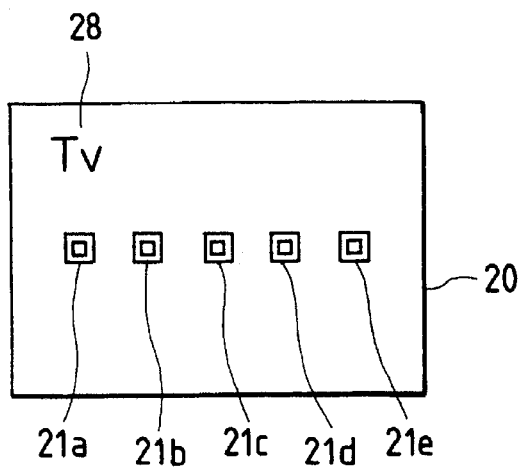
FIGS. 21A and 21B are views for illustrating the indicating operation of the display device in the finder shown in FIG. 15.

FIG. 21A shows the finder indication in the state before in-focus in a case where a photo-taking lens which is small in F number and bright is mounted or a case where even in a photo-taking lens which is relatively great in F number and dark, an exit window is at a location whereat it is difficult for the distance measuring light beam to be eclipsed and all distance measuring fields of the focus detecting device 16 are distance-measurable, and Tv display indicating the shutter speed priority mode and the distance measuring field frames 21a–21e are indicated in the finder field 20. In this figure, the indication state of the distance measuring field frames is shown by dual line, but actually, only the indicating portion is decreased in object light by the diffracting action of the indication element 25 and looks substantially black.

Figure 21B:
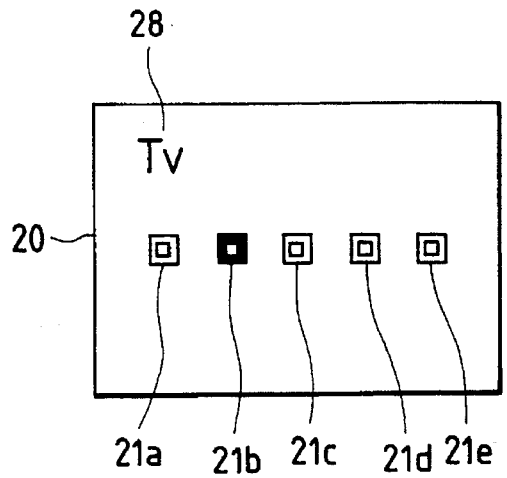

In contrast, FIG. 21B shows the in-focus display when it is detected that the photographer's sight axis is near the distance measuring field frame 21b, and the photo-taking lens is driven on the basis of the result of the focus detection of the distance measuring field corresponding thereto, with a result that the in-focus state is reached, and the color change indication of the distance measuring field frame 21b is effected. In this figure, the distance measuring field frame is expressed by being painted out, but actually the distance measuring frame looks tinged with the color of the emitted light of LED.

Figure 22A:
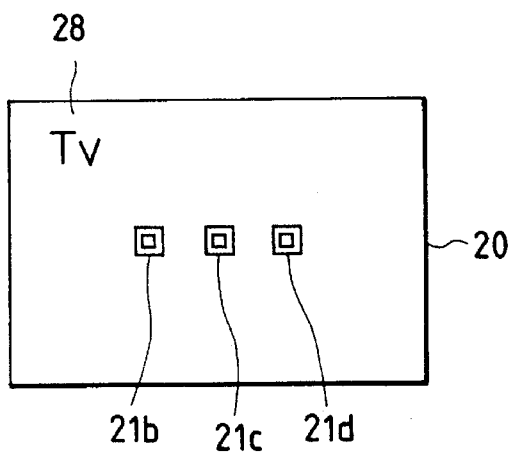
FIGS. 22A and 22B are views for illustrating also the indicating operation of the display device in the finder shown in FIG. 15.
Figure 22B:
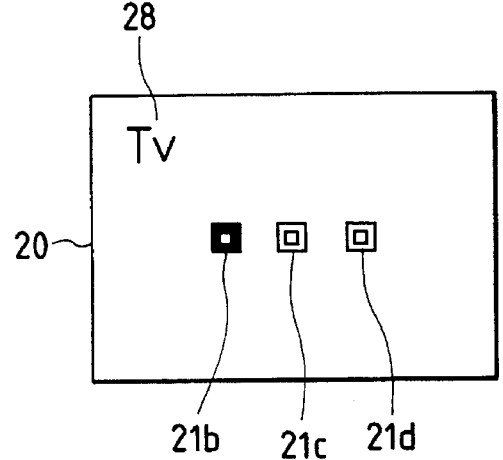

FIGS. 22A and 22B show the finder indication in a case where a photo-taking lens which is great in F number and dark is mounted or a case where even in a photo-taking lens which is relatively small in F number and bright, an exit window is at a location whereat the distance measuring light beam is ready to be eclipsed and the outer distance measuring field of the focus detecting device 16 is distance-unmeasurable.

In FIG. 22A which shows the state before infocus, only the three central distance measuring field frames 21b–21d are indicated, and the photographer can know the operating situation of the distance measuring fields while looking into the finder.

In FIG. 22B, as in FIG. 21B, the distance measuring field frame 21b corresponding to the distance measuring field which is in focus changes to the color of the emitted light of LED and informs the photographer that the lens is in focus.

According to the present embodiment, design is made such that whether the distance measurement of each distance measuring field is possible is judged on the basis of the exit window information about a point on the predetermined imaging plane which is at a predetermined distance from the optical axis, and further on the basis of the exit window information at the position whereat the effective F number of the photo-taking lens becomes greatest in the whole range in which focusing is possible, and therefore the amount of the exit window information stored in the photo-taking lens is suppressed small, and yet practically sufficiently accurate judgment becomes possible with respect to the eclipse of the distance measuring light beam.

Also, in a device having distance measuring fields at a plurality of locations in the photographing image field, even when a photo-taking lens having an exit window nearer or farther than in the prior art is mounted, the presence or absence of the eclipse of the distance measuring light beam can be accurately judged with respect to each distance measuring field of the focus detecting device and therefore, it is possible to render the distance measuring field in which eclipse occurs inoperative, Whereby a normal distance measuring operation as a camera can be ensured.

Also, the result of the above-described judgment of distance measurement is displayed by controlling the indication in the finder so that the unusable distance measuring fields may be brought into the non-display state, the distance measuring field frames of the usable distance measuring fields may be brought into the display state and the in-focus display may be done by color change display and therefore, the photographer can be made to recognize the focus detecting operation very clearly, and particularly in a focus detecting device wherein distance measuring fields are set on the basis of a sight axis detecting device, it is possible to turn the photographer's sight axis toward a distance-measurable distance measuring field.

Also, the design of the photo-taking lens is not limited by the location of the exit window and therefore, a more compact photo-taking lens or a zoom lens of a higher magnification can be realized.

What is claimed is:

1. A camera usable with an imaging optical system and having a focus detecting device which has a plurality of fields of view and detects a focus state for each of the fields of view, said camera comprising:

a display device for effecting an indication representative of a position corresponding to each of the fields of view; and a display control circuit for prohibiting an indication representative of a position of a particular field of view based on a characteristic of the imaging optical system that guides light corresponding to each of the fields of view of a scene to a light receiving plane, said display control circuit performing an indication prohibiting operation independently of a result of the focus detection of each of the fields of view by said focus detecting device.

2. A camera according to claim 1, wherein said camera includes a finder, and wherein said display device has marks, representative of the fields of view, at locations in the finder corresponding to the fields of view, and wherein said display control circuit prohibits display of an indication corresponding to the mark representative of the position of the particular field of view.

3. A camera according to claim 1, further comprising a judging circuit for judging whether a light beam from each of the fields of view is eclipsed by an imaging optical system, and for judging that the detection of the focus state is impossible when it is judged that the light beam is eclipsed, and wherein said display control circuit prohibits the indication representative of a position of a particular field of view where it is judged that the detection of the focus state for that field of view is impossible.

4. A camera according to claim 2, further comprising a judging circuit for judging whether a light beam from each of the fields of view is eclipsed by an imaging optical system, and for judging that the detection of the focus state is impossible when it is judged that the light beam is eclipsed, and wherein said display control circuit prohibits a display of an indication corresponding to said mark representative of a position of a field of view where it is judged that the detection of the focus state for that field of view is impossible.

5. A camera according to claim 3, wherein said judging circuit effects said judgment for each of the fields of view.

6. A camera according to claim 4, wherein said judging circuit effects said judgment for each of the fields of view.

7. A camera according to claim 4, wherein said marks are disposed in the image field area in the finder.

8. A camera having:

a focus detecting device for detecting focus states in different areas of a scene;

a finder;

a display device for displaying a position corresponding to each of the different areas of the scene by one of a plurality of marks in said finder, wherein each of said plurality of marks is capable of being in a viewable display state simultaneously with other of said plurality of marks; and a control circuit for changing over the number of marks simultaneously in the viewable display state between a first number and a second number greater than said first number.

9. A camera according to claim 8, wherein said marks are provided in an image field of the finder.

10. A camera according to claim 9, wherein said marks are marks for indicating focus areas.

11. A camera according to claim 10, wherein said first number is 3 and said second number is 5.

12. A camera according to claim 8, wherein when the focus state in areas corresponding to outermost portions of the scene is undetectable, said control circuit changes over the number of the marks from said first number to said second number.

13. A camera having a focus detecting device., usable with an imaging optical system, for detecting focus states in each of different areas of a scene, said camera comprising:

a plurality of focus detecting sensors, each focus detecting sensor corresponding to a different area; and a judging circuit for judging, on the basis of information regarding a characteristic of the imaging optical system, whether a light beam for detecting the focus state in each of the different areas is eclipsed by the imaging optical system;

wherein said light beam enters each of said plurality of focus detecting sensors provided for each of the areas through the imaging optical system.

14. A camera according to claim 13, wherein the information regarding the characteristic of the imaging optical system relates to an exit window corresponding to a particular area.

15. A camera according to claim 14, wherein the particular area is an area corresponding to an outermost portion of the scene.

16. A camera according to claim 13, wherein the information regarding the characteristic of the imaging optical system relates to an exit window having a characteristic corresponding to the focal length of the imaging optical system.

17. A camera according to claim 16, wherein the imaging optical system includes a photo-taking lens, and wherein the information relating to the exit window is stored in a memory provided in the photo-taking lens.

18. A camera having a focus state detecting device, usable with an imaging optical system, for detecting focus states corresponding to different areas of a scene, the different areas having corresponding exit windows in the imaging optical system, said camera comprising:

a judging circuit for judging, on the basis of information regarding an exit window for a particular area, whether a light beam for detecting the focus state corresponding to that area is eclipsed by the imaging optical system; and a prohibiting circuit for prohibiting said focus state detecting device from detecting a focus state corresponding to the particular area when it is judged by said judging circuit that the light beam is eclipsed.

19. A camera according to claim 18, wherein the particular area is an area corresponding to the outermost portion of the scene.

20. A camera having (i) a finder and (ii) a focus state detecting device for detecting focus states corresponding to different areas of a scene, said camera comprising:

a sight axis detecting device for detecting a position of an operator's sight axis, said sight axis detecting device having an indicating circuit for indicating in a field of view of the finder a plurality of marks for detecting the position of the sight axis of the operator, a focus detecting area of the focus state detecting device being arbitrarily selectable in accordance with a position of a particular mark gazed at by the operator from among the plurality of marks; and a prohibiting circuit for selecting a mark in a position corresponding to a focus detecting area where focus detection is impossible and for prohibiting the indication of that mark.

21. A focus detecting device, usable with an imaging optical system, having a plurality of fields of view for detecting a focus state for each of the fields of view, said focus detecting device comprising:

a display device for effecting an indication representative of a position corresponding to each of the fields of view; and a display control circuit for prohibiting an indication representative of a position of a particular field of view based on a characteristic of the imaging optical system that guides light corresponding to each of the fields of view of a scene to a light receiving plane.

22. A focus detecting device according to claim 21, wherein said focus detecting device includes a finder, and wherein said display device has marks, representative of the fields of view, at locations in the finder corresponding to the fields of view, and wherein said display control circuit prohibits display of an indication corresponding to the mark of the position of the particular field of view.

23. A focus detecting device according to claim 22, further comprising a judging circuit for judging whether a light beam from each of the fields of view is eclipsed by an imaging optical system, and for judging that the detection of the focus state is impossible when it is judged that the light beam is eclipsed, and wherein said display control circuit prohibits the display of the marks representative of a position of a particular field of view where it is judged that the detection of the focus state for that field of view is impossible.

24. A focus detecting device, usable with an imaging optical system, for detecting focus states in each of different areas of a scene, said focus detecting device comprising:

a plurality of focus detecting sensors, each focus detecting sensor corresponding to a different area; and a judging circuit for judging, on the basis of information regarding a characteristic of the imaging optical system, whether a light beam for detecting the focus state in each of the different areas is eclipsed by the imaging optical system;

wherein said light beam enters each of said plurality of focus detecting sensors provided for each of the areas through the imaging optical system.

25. A focus detecting device according to claim 24, wherein the information regarding the characteristic of the imaging optical system relates to an exit window corresponding to a particular area.

26. A focus detecting device according to claim 25, wherein the particular area is an area corresponding to an outermost portion of the scene.

27. A focus detecting device according to claim 24, wherein the information regarding the characteristic of the imaging optical system relates to an exit window having a characteristic corresponding to the focal length of the imaging optical system.

28. A focus detecting device according to claim 27, wherein the imaging optical system includes a photo-taking lens, and wherein the information relating to the exit window is stored in a memory provided in the photo-taking lens.

29. A focus state detecting device, usable with an imaging optical system, for detecting focus states corresponding to different areas of a scene, the different areas having corresponding exit windows in the imaging optical system, said focus state detecting device comprising:

a judging circuit for judging, on the basis of information regarding an exit window for a particular area, whether a light beam for detecting the focus state corresponding to that area is eclipsed by the imaging optical system; and a prohibiting circuit for prohibiting said focus state detecting device from detecting a focus state corresponding to the particular area when it is judged by said judging circuit that the light beam is eclipsed.

30. A focus state detecting device according to claim 29, wherein the particular area is an area corresponding to the outermost portion of the scene.

31. A focus state detecting device for detecting focus states corresponding to different areas of a scene, said focus state detecting device comprising:

a sight axis detecting device for detecting a position of an operator's sight axis, said sight axis detecting device having an indicating circuit for indicating in a field of view of a finder a plurality of marks for detecting the position of the sight axis of the operator, a focus detecting area of the focus state detecting device being arbitrarily selectable in accordance with a position of a particular mark gazed at by the operator from among the plurality of marks; and a prohibiting circuit for selecting a mark in a position corresponding to a focus detecting area where focus detection is impossible and for prohibiting the indication of that mark.

32. A camera having a focus detecting device which has a plurality of fields of view and detects a focus state for each of the fields of view, said camera comprising:

a display device for indicating marks representing positions corresponding to each of the plurality of fields of view, and for causing a number of marks to simultaneously be in a viewable display state; and a change circuit for changing the number of marks which are simultaneously in the viewable display state in accordance with a predetermined field of view for which the detection of the focus state is impossible.

33. A camera according to claim 32, wherein said change circuit changes the number of marks which are simultaneously in the viewable display state by causing marks to be in a non-viewable display state, wherein the non-viewable display state marks correspond to the fields of view for which the detection of the focus state is impossible.

34. A focus detecting device, having a plurality of fields of view, for detecting a focus state for each of the fields of view, said focus detecting device comprising:

a display device for indicating marks representing positions corresponding to each of the plurality of fields of view, and for causing a number of marks to simultaneously be in a viewable display state; and a change circuit for changing the number of marks which are simultaneously in the viewable display state in accordance with a predetermined field of view for which the detection of the focus state is impossible.

35. A focus detecting device according to claim 34, wherein said change circuit changes the number of marks which are simultaneously in the viewable display state by causing marks to be in a non-viewable display state, wherein the non-viewable display state marks correspond to the fields of view for which the detection of the focus state is impossible.

36. A focus detecting device, having a plurality of fields of view, for detecting a focus state for each of the fields of view, said focus detecting device comprising:

a display device for indicating marks representing positions corresponding to each of the plurality of fields of view, and for causing marks to simultaneously be in a viewable display state;

a sight axis detecting device for detecting a position of an operator's sight axis by detecting to which mark from among the indicated marks the operator's sight axis is directed; and a selecting circuit for selecting a field of view, corresponding to the mark to which it is judged by said sight axis detecting device that the operator's sight axis is directed, as a focus detection point, said selecting circuit prohibiting selection of a field of view for which the detection of the focus state is impossible as the focus detection point, regardless of whether the operator's sight axis is directed to the position of a mark representing a position corresponding to that field of view.

37. A camera usable with an imaging optical system and having a focus detecting device which has a plurality of fields of view and detects a focus state for each of the fields of view, said camera comprising:

a display device for effecting an indication representative of a position corresponding to each of the fields of view; and a display control circuit for changing an indication representative of a position of a particular field of view based on a characteristic of the imaging optical system that guides light corresponding to each of the fields of view of a scene to a light receiving plane, said display control circuit performing an indication changing operation independently of a result of the focus detection of each of the fields of view by said focus detecting device.

38. A camera having a focus detecting device, usable with an imaging optical system, for detecting focus states in each of different areas of a scene, said camera comprising:

a plurality of focus detecting sensors, each focus detecting sensor corresponding to a different area, light beams incident on said plurality of focus detecting sensors passing through the imaging optical system; and a judging circuit for judging, on the basis of information regarding a characteristic of the imaging optical system, whether a light beam for detecting a focus state of a particular area is eclipsed by the imaging optical system.

39. A camera having (i) a finder and (ii) a focus state detecting device for detecting focus states corresponding to different areas of a scene, said camera comprising:

a sight axis detecting device for detecting a position of an operator's sight axis, said sight axis detecting device having an indicating circuit for indicating in a field of view of the finder a plurality of marks for detecting the position of the sight axis of the operator, a focus detecting area of the focus state detecting device being arbitrarily selectable in accordance with a position of a particular mark gazed at by the operator from among the plurality of marks; and a prohibiting circuit for selecting a mark in a position corresponding to the focus detecting area where the focus detection is impossible and for prohibiting the indication of the mark.

40. A focus detecting device, having a plurality of fields of view, for detecting a focus state for each of the fields of view, said focus detecting device comprising:

a sight axis detecting device for detecting a position of an operator's sight axis; and a selecting circuit for selecting as a focus detection point a field of view corresponding to the position to which it is detected by said sight axis detecting device that the operator's sight axis is directed, said selecting circuit prohibiting selection of a field of view for which the detection of the focus state is impossible as the focus detection point, regardless of whether the operator's sight axis is directed to the position corresponding to that field of view.

* * * * *

UNITED STATES PATENT AND TRADEMARK OFFICE
CERTIFICATE OF CORRECTION

PATENT NO. : 5,473,403
DATED : December 5, 1995
INVENTOR(S) : YASUO SUDA, et al.

It is certified that error appears in the above-indentified patent and that said Letters Patent is hereby corrected as shown below:

COLUMN 2

Line 25, delete "small,".

COLUMN 5

Line 11, "focusing" should read --a focusing--.

COLUMN 8

Line 3, "sixteen," should read --sixteen--.

COLUMN 9

Line 17, "angle e" should read --angle $\theta$--.
Line 39, "angle e" should read --angle $\theta$--.

COLUMN 10

Line 46, "foure-figure" should read --four-figure--.
Line 51, "foure-figure" should read --four-figure--.

COLUMN 11

Line 12, "shown r" should read --shown,--.

COLUMN 12

Line 2, "indes" should read --index--.
Line 19, "index ne" should read --index n$\theta$--.

UNITED STATES PATENT AND TRADEMARK OFFICE
CERTIFICATE OF CORRECTION

PATENT NO. : 5,473,403

DATED : December 5, 1995

INVENTOR(S) : YASUO SUDA, et al.

It is certified that error appears in the above-indentified patent and that said Letters Patent is hereby corrected as shown below:

COLUMN 13

Line 50, "m 32 I," should read --m = 1,--.

COLUMN 14

Line 14, "is-executed," should read --is executed--.
Line 48, "and the" should read --and then--.

COLUMN 15

Line 65, "to-the" should read --to the--.

COLUMN 16

Line 2, "practices" should read --practice.--.
Line 41, "infocus," should read --in-focus,--.

UNITED STATES PATENT AND TRADEMARK OFFICE
CERTIFICATE OF CORRECTION

PATENT NO. : 5,473,403

DATED : December 5, 1995

INVENTOR(S) : YASUO SUDA, et al.

It is certified that error appears in the above-indentified patent and that said Letters Patent is hereby corrected as shown below:

COLUMN 17

Line 4, "Whereby" should read --whereby--.

COLUMN 18

Line 30, "device." should read --device,--.

Signed and Sealed this

Second Day of April, 1996

Attest:

Attesting Officer

BRUCE LEHMAN

Commissioner of Patents and Trademarks